(12) United States Patent
Wang et al.

(10) Patent No.: US 9,510,376 B2
(45) Date of Patent: Nov. 29, 2016

(54) TUNNELING PACKET EXCHANGE IN LONG TERM EVOLUTION PROTOCOL BASED NETWORKS

(71) Applicant: AT&T Intellectual Property I, LP, Atlanta, GA (US)

(72) Inventors: Jiansong Wang, Parlin, NJ (US); Ryan Redfern, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

(21) Appl. No.: 14/036,919

(22) Filed: Sep. 25, 2013

(65) Prior Publication Data

US 2015/0085845 A1    Mar. 26, 2015

(51) Int. Cl.
*H04W 76/02* (2009.01)
*H04W 76/04* (2009.01)
*H04W 36/00* (2009.01)

(52) U.S. Cl.
CPC ......... *H04W 76/022* (2013.01); *H04W 76/023* (2013.01); *H04W 76/043* (2013.01); *H04W 36/0005* (2013.01); *H04W 76/041* (2013.01)

(58) Field of Classification Search
CPC ........... H04W 76/022; H04W 76/023; H04W 76/043; H04W 36/0005; H04W 76/041
See application file for complete search history.

(56) References Cited

U.S. PATENT DOCUMENTS

| 7,328,035 | B2 * | 2/2008 | Kelley et al. ................. 455/518 |
| 8,401,068 | B2 | 3/2013 | Ulupinar et al. |
| 8,422,452 | B2 | 4/2013 | Zembutsu et al. |
| 8,619,654 | B2 * | 12/2013 | Yang et al. ................... 370/311 |
| 2009/0240795 | A1 | 9/2009 | Tsirtsis et al. |
| 2010/0046418 | A1 | 2/2010 | Horn et al. |
| 2010/0124223 | A1 | 5/2010 | Gibbs et al. |
| 2010/0153727 | A1 | 6/2010 | Reznik et al. |
| 2011/0280173 | A1 * | 11/2011 | Ha ....................... H04W 76/041 370/312 |

(Continued)

FOREIGN PATENT DOCUMENTS

JP    2012-170162    9/2012

OTHER PUBLICATIONS

3GPP TS 23.002 V11.3.0 (2012-06), "Network architecture (Release 11)".*
3GPP TS 29.281 V11.3.0 (Jun. 2012), "General Packet Radio System (GPRS) Tunnelling Protocol User Plane (GTPv1-U) (Release 11)".*

(Continued)

*Primary Examiner* — Kwang B Yao
*Assistant Examiner* — Moo Jeong
(74) *Attorney, Agent, or Firm* — Guntin & Gust, PLC; Jay H. Anderson

(57) ABSTRACT

A system that incorporates the subject disclosure may include, for example, receiving from a wireless device a request for a network connection and facilitating, in response to the request, a communication session between a wireless access node in communication with the wireless device and a packet data network. Control signals are exchanged between a second network device and a packet data network gateway. The second network device includes a mobility anchoring function and operating in an evolved packet core of a long term evolution system. Eligibility of the wireless communication device to participate in a direct tunnel connection is determined, the direct tunnel allowing transfer of user data packets between the wireless device and packet data network to bypass the mobility anchoring function. Establishment of the direct tunnel connection is facilitated to transfer multiple user data packets between the wireless device and the packet data network.

20 Claims, 15 Drawing Sheets

(56) References Cited

U.S. PATENT DOCUMENTS

| | | |
|---|---|---|
| 2012/0076047 A1 | 3/2012 | Turányi et al. |
| 2012/0144226 A1 | 6/2012 | Yang et al. |
| 2012/0184294 A1 | 7/2012 | Stojanovski et al. |
| 2012/0189016 A1 | 7/2012 | Bakker et al. |
| 2012/0250509 A1 | 10/2012 | Leung et al. |
| 2013/0028421 A1 | 1/2013 | Feng et al. |
| 2013/0163424 A1 | 6/2013 | Goerke et al. |
| 2013/0294403 A1* | 11/2013 | Srinivasan .......... H04W 36/165 370/331 |
| 2013/0315068 A1* | 11/2013 | Kim et al. .................... 370/236 |
| 2014/0112151 A1* | 4/2014 | Olsson ................... H04W 8/08 370/237 |
| 2014/0169332 A1* | 6/2014 | Taleb ................ H04W 36/0011 370/331 |
| 2014/0293882 A1* | 10/2014 | Choi et al. .................... 370/329 |

OTHER PUBLICATIONS

3GPP TR 23.829 V10.0.1 (2011-10), "Local IP Access and Selected IP Traffic Offload (LIPA-SIPTO) (Release 10)".*

"General Packet Radio System (GPRS) Tunnelling Protocol User Plane (GTPv1 -U) (Release 11)", 3GPP TS 29.281 V11.3.0 (Jun. 2012).

"Local IP Access and Selected IP Traffic Offload (LIPA-SI PTO) (Release 10)", 3GPP TR 23.829 V10.0.1 (Oct. 2011).

"Network architecture (Release 11 )", 3GPP TS 23.002 V11.3.0 (Jun. 2012).

Hahn, "Flat 3GPP Evolved Packet Core", 2011 14th International Symposium on Wireless Personal Multimedia Communications (WPMC). Oct. 2011. pp. 1-5.

Liebl, "Experimental Testbed for 3GPP System Architecture Evolution", SIMUTools '10 Proceedings of the 3rd International ICST Conference on Simulation Tools and Techniques. 2010, Article 88.

* cited by examiner

100

200

TUNNELING PACKET EXCHANGE IN LONG TERM EVOLUTION PROTOCOL BASED NETWORKS

FIELD OF THE DISCLOSURE

The subject disclosure relates to a tunneling packet exchange in long term evolution protocol based networks.

BACKGROUND

Wireless telecommunication networks use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communications technologies are used in connection with user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology. One or more applications running on such devices, such as Voice over IP (VoIP), browsing, streaming media, text messaging and so forth, can engage in an exchange of data packets with another network, such as the Internet, an IP multimedia subsystem, and/or some other provider network.

BRIEF DESCRIPTION OF THE DRAWINGS

Reference will now be made to the accompanying drawings, which are not necessarily drawn to scale, and wherein.

DETAILED DESCRIPTION

Figure 1:
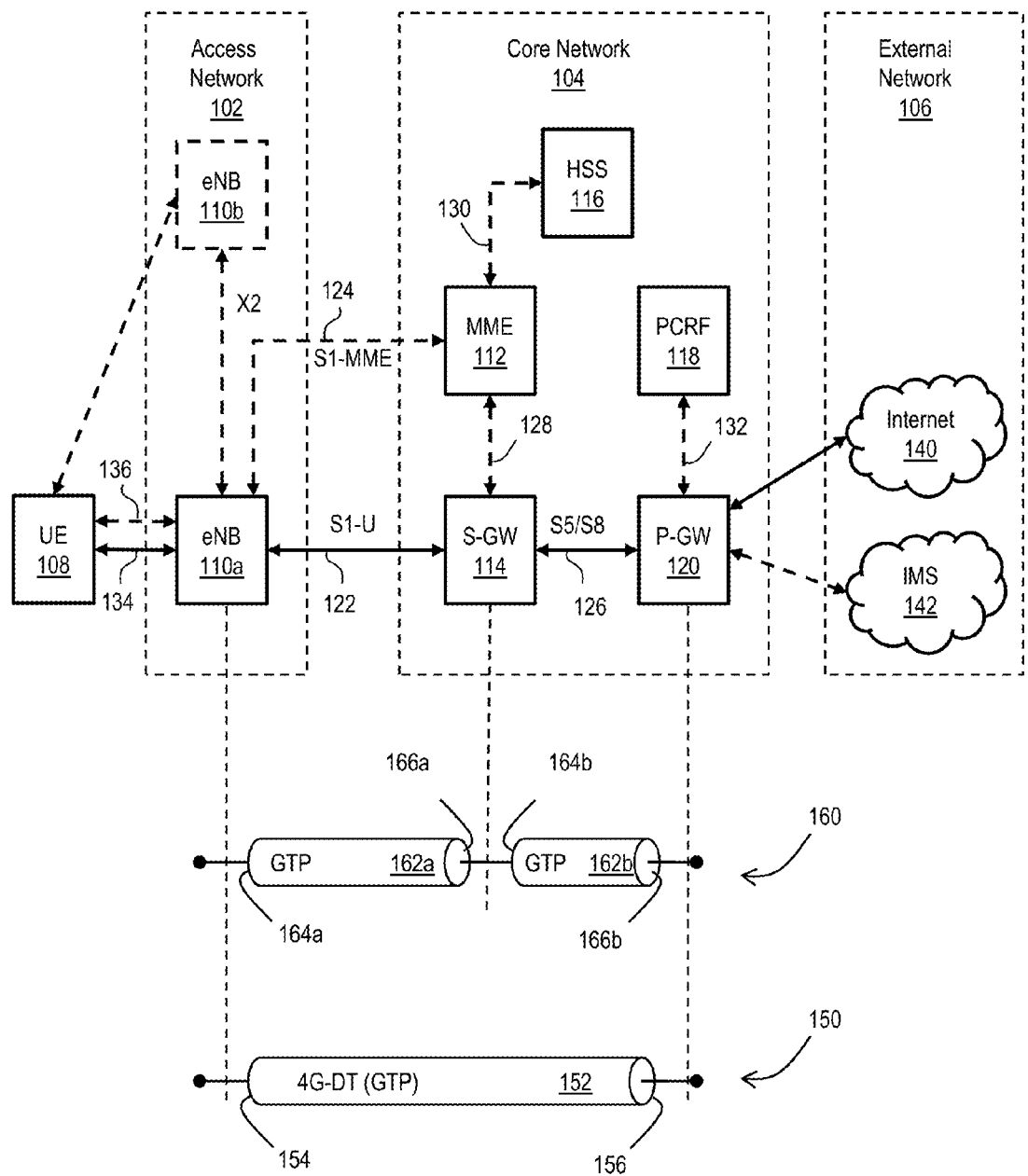
FIG. 1 depicts an illustrative embodiment of a communication network including a long term evolution (LTE), evolved packet core (EPC) topology.

The subject disclosure describes, among other things, illustrative embodiments of tunneling packet exchanges in LTE protocol based networks. Application of General Packet Radio System (GPRS) Tunneling Protocol (GTP) to tunnel user packets exists today within LTE protocol based networks. Current applications of GTP technology within LTE based networks, however, are inefficient at least in that user packets must go through the Serving Gateway (SGW). The subject disclosure describes a new standard tunneling interface, e.g., directly between a Radio Access Network and the Packet Data Network gateway (PDN GW), or Data Session Anchor Point, by bypassing the SGW. The direct tunnel offers benefits, including, improved network efficiency, reduced user packet delay, and improved end-user perceived data throughput. In at least some embodiments, the direct tunneling interface disclosed herein can utilize the GTP protocol. Other embodiments are included in the subject disclosure.

One embodiment of the subject disclosure relates to a process that includes receiving, by a mobility management entity having a processor, a request for a network connection between a wireless communication device and a packet data network. The process further includes facilitating, by the mobility management entity, a communication session between an evolved node B in wireless communication with the wireless communication device and the packet data network. The facilitating of the network connection includes an exchange of control signaling between a second network device and a packet data network gateway, wherein the second network device, operating in an evolved packet core network of a long term evolution system, includes a serving gateway function. A mobility metric of the wireless communication device is determined by the mobility management entity, and a tunnel solution is identified, also by the mobility management entity, responsive to the determining of the mobility metric. The tunnel solution includes a first tunnel connection to transfer multiple user data packets between the wireless communication device and the packet data network.

Another embodiment of the subject disclosure relates to a machine-readable storage medium, including executable instructions which, responsive to being executed by a processor, cause the processor to perform operations. The operations include receiving a request for a network connection between a wireless communication device and a packet data network. The operations also include facilitating a communication session between a wireless access node in wireless communication with the wireless communication device and the packet data network. The facilitating of the network connection includes an exchange of control signaling between a second network device and a packet data network gateway. The second network device, operating in an evolved packet core network of a long term evolution system, includes a serving gateway function. The operations further include determining a mobility metric of the wireless communication device, and identifying a tunnel solution responsive to the determining of the mobility metric. The tunnel solution includes a first tunnel connection to transfer multiple user data packets between the wireless communication device and the packet data network.

Yet another embodiment of the subject disclosure includes a device having memory to store executable instructions and a processor coupled to the memory, wherein the processor, responsive to executing the executable instructions, performs operations. The operations include receiving a request for a network connection between a wireless communication device and a packet data network. The operations also include facilitating a communication session between a wireless access node in wireless communication with the wireless communication device and the packet data network. The facilitating of the network connection includes an exchange of control signaling between a second network device and a packet data network gateway. The second network device, operating in an evolved packet core network of a long term evolution system, includes a mobility anchoring function. The operations further include determining eligibility of the wireless communication device to participate in a direct tunnel connection allowing a transfer of multiple user data packets between the wireless communication device and the packet data network to bypass the mobility anchoring function. The direct tunnel connection is facilitated to transfer the multiple user data packets between the wireless communication device and the packet data network.

The present disclosure broadly discloses a method, a non-transitory machine readable medium and an apparatus for performing packet routing in a network architecture, such as the long-term evolution, evolved packet system network architecture. FIG. 1 illustrates a functional block diagram depicting one example of a long-term evolution (LTE), evolved packet system (EPS) network architecture 100 related to the current disclosure. In particular, the network architecture 100 disclosed herein is referred to as a modified LTE-EPS architecture 100 to distinguish it from a traditional LTE-EPS architecture.

An example modified LTE-EPS architecture 100 is based at least in part on standards developed by the 3rd Generation Partnership Project (3GPP), with information available at www.3gpp.org. In one embodiment, the LTE-EPS network architecture 100 includes an access network 102, a core network 104, e.g., an evolved packet core (EPC) or common backbone (CBB) and one or more external networks 106, sometimes referred to as packet data networks (PDN) or peer entities. Different external networks 106 can be distinguished from each other by a respective network identifier, e.g., a label according to DNS naming conventions describing an access point to the PDN. Such labels can be referred to as access point name (APN). The external networks 106 can include one or more trusted and non-trusted external networks such as an internet protocol (IP) network 140, an IP multimedia subsystem (IMS) network 142, and other networks not shown, such as a service network, a corporate network and the like.

The access network 102 can include an LTE network architecture sometimes referred to as evolved universal mobile telecommunication system terrestrial radio access (E UTRA) and evolved UMTS terrestrial radio access network (E-UTRAN). Broadly, the access network 102 can include one or more communication devices, commonly referred to as user equipment (UE) 108, and one or more wireless access nodes, or base stations 110a, 110b (generally 110). During network operations, at least one base station 110 communicates directly with the UE 108. In one embodiment, the base station 110 may be an evolved Node B (eNodeB), with which the UE 108 communicates over the air and wirelessly. UEs 108 can include, without limitation, wireless devices, e.g., satellite communication systems, portable digital assistants (PDAs), laptop computers, tablet devices and other mobile devices (e.g., cellular telephones). Such UEs 108 can connect to the eNBs 110 as long as the UE 108 is within range according to a corresponding wireless communication technology.

The UE 108 generally runs one or more applications that engage in a transfer of packets between the UE 108 and one or more of the external networks 106. Such packet transfers can include one of downlink packet transfers from the external network 106 to the UE 108, uplink packet transfers from the UE 108 to the external network 106 or combinations of uplink and downlink transfers. Applications can include, without limitation, web browsing, VoIP, streaming media and the like. Each application can pose different quality of service (QoS) requirements on a respective packet transfer. Different packet transfers can be served by different bearers within the core network 104, e.g., according to parameters, such as the QoS.

The core network 104 uses a concept of bearers, e.g., EPS bearers, to route packets, e.g., IP traffic, between a particular gateway in the core network 104 and the UE 108. A bearer refers generally to an IP packet flow with a defined QoS between the particular gateway and the UE 108. The access network 102, e.g., E UTRAN, and the core network 104 together set up and release bearers as required by the applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 104 includes various network entities, such as a mobile management entity (MME) 112, a serving gateway (SGW) 114, a home subscriber server (HSS) 116, a policy and charging rules function (PCRF) 118 and a packet data network (PDN) gateway (PGW) 120. In one embodiment, the MME 112 comprises a control node performing a control signaling between various equipment and devices in the access network 102 and the core network 104. The protocols running between the UE 108 and the core network 104 are generally known as non-access stratum (NAS) protocols.

For illustration purposes only, the terms MME 112, SGW 114, HSS 116 and PGW 120, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Disclosed herein are techniques related to a novel direct tunnel interface, e.g., between a RAN and a PGW of an LTE protocol-based network. Also disclosed herein are various methodologies and novel logics to establish, maintain and release direct tunnels, and to manage direct tunnels (e.g., based on one or more of user subscription information, user device type information and user mobility information) according to such direct tunnel interfaces. Related user mobility detection algorithms and/or triggers to manage such direct tunnels, e.g., in real time for LTE data sessions, are also disclosed.

According to traditional implementations of LTE-EPS architectures, the SGW 114 routes and forwards all user data packets. The SGW 114 also acts as a mobility anchor for user plane operation during handovers between base stations, e.g., during a handover from a first eNB 110a to a second eNB 110b as may be the result of the UE 108 moving from one area of coverage, e.g., cell, to another. The SGW 114 can also terminate a downlink data path, e.g., from the external network 106 to the UE 108 in an idle state, and trigger a paging operation when downlink data arrives for the UE 108. The SGW 114 can also be configured to manage and store a context for the UE 108, e.g., including one or more of parameters of the IP bearer service and network internal routing information. In addition, the SGW 114 can perform administrative functions, e.g., in a visited network, such as collecting information for charging (e.g., the volume of data sent to or received from the user), and/or replicate user traffic, e.g., to support a lawful interception. The SGW 114 also serves as the mobility anchor for interworking with other 3GPP technologies such as universal mobile telecommunication system (UMTS).

At any given time, the UE 108 is generally in one of three different states: detached, idle and active. The detached state is typically a transitory state in which the UE 108 is powered on but is engaged in a process of searching and registering with the network 102. In the active state, the UE 108 is registered with the access network 102 and has established a wireless connection, e.g., radio resource control (RRC) connection, with the eNB 110. Whether the UE 108 is in an active state can depend on the state of a packet data session, and whether there is an active packet data session. In the idle state, the UE 108 is in a power conservation state in which the UE 108 typically does not communicate packets. When the UE 108 is idle, the SGW 114 terminates a downlink data path, e.g., from one of the peer entities 106, and triggers paging of the UE 108 when data arrives for the UE 108. If the UE 108 responds to the page, the SGW 114 forwards the IP packet to the eNB 110a.

The HSS 116 can manage subscription-related information for a user of the UE 108. For example, the HSS 116 can store information such as authorization of the user, security requirements for the user, quality of service (QoS) requirements for the user, etc. The HSS 116 can also hold information about the external networks 106 to which the user can connect, e.g., in the form of an APN of the external networks 106. For example, the MME 112 can communicate with the HSS 116 to determine if the UE 108 is even authorized to establish a call, e.g., a voice over IP (VoIP) call before the call is established.

The PCRF 118 can perform QoS management functions and policy control. The PCRF 118 is responsible for policy control decision-making, as well as for controlling the flow-based charging functionalities in a policy control enforcement function (PCEF), which resides in the PGW 120. The PCRF 118 provides the QoS authorization, e.g., QoS class identifier and bit rates that decide how a certain data flow will be treated in the PCEF and ensures that this is in accordance with the user's subscription profile.

The PGW 120 can provide connectivity between the UE 108 and one or more of the external networks 106. In the illustrative network architecture 100, the PGW 120 is responsible for IP address allocation for the UE 108, as well as QoS enforcement and flow-based charging according to rules from the PCRF 118. The PGW 120 is also typically responsible for filtering downlink user IP packets into the different QoS-based bearers. In at least some embodiments, such filtering can be performed based on traffic flow templates. The PGW 120 can also perform QoS enforcement, e.g., for guaranteed bit rate bearers. The PGW 120 also serves as a mobility anchor for interworking with non-3GPP technologies such as CDMA2000 and WiMAX® networks.

Within the access network 102 and the core network 104 there may be various bearer paths/interfaces, e.g., represented by solid lines 122 and 124. Some of the bearer paths can be referred to by a specific label. For example, the solid line 122 can be considered an S1-U bearer and the solid line 126 can be considered an S5/S8 bearer according to LTE-EPS architecture standards. Without limitation, reference to various interfaces, such as S1, X2, S5, S8, S11 refer to interfaces of the evolved packet system. In some instances, such interface designations are combined with a suffix, e.g., a "U" or a "C" to signify whether the interface relates to a user plane or a control plane. In addition, the core network 104 can include various signaling bearer paths/interfaces, e.g., represented by dashed lines 124, 128, 130 and 132. Some of the signaling bearer paths may be referred to by a specific label. For example, the dashed line 124 can be considered as an S1-MME signaling bearer, the dashed line 128 can be considered as an S11 signaling bearer and the dashed line 130 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

It should be noted that the access network 102 and the core network 104 are illustrated in a simplified block diagram in FIG. 1. In other words, either or both of the access network 102 and the core network 104 can include additional network elements that are not shown, such as various routers, switches and controllers. In addition, although FIG. 1 illustrates only a single one of each of the various network elements, it should be noted that the access network 102 and the core network 104 can include any number of the various network elements. For example, the core network 104 can include a pool (i.e., more than one) of MMEs 112, SGWs 114 or PGWs 120.

In the illustrative example, data traversing the UE 108, the eNB 110a, the SGW 114, the PGW 120 and the external network 106 may be considered to constitute an end-to-end IP service. However, for the present disclosure, to properly perform establishment management in the LTE-EPS network architecture 100, only the core network data bearer portion of the end-to-end IP service is analyzed.

An establishment may be defined herein as a connection set up request between any two elements within the LTE-EPS network architecture 100. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 134) between the UE 108 and the eNB 110a, a second portion (e.g., an S1 data bearer 122) between the eNB 110a and the SGW 114, and a third portion (e.g., an S5/S8 bearer 126) between the SGW 114 and the PGW 120. Various signaling bearer portions are also illustrated in FIG. 1. For example, a first signaling portion (e.g., a signaling radio bearer 136) between the UE 108 and the eNB 110a, and a second signaling portion (e.g., an S1 signaling bearer 124) between the eNB 110a and the MME 112.

In at least some embodiments, the data bearer can include tunneling, e.g., IP tunneling, by which data packets can be forwarded, e.g., in an encapsulated manner, between tunnel endpoints. Tunnels, or tunnel connections can be identified in one or more nodes of the network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of a first tunnel solution 160 includes a first tunnel 162a between tunnel endpoints 164a and 166a, and a second tunnel 162b between tunnel endpoints 164b and 166b. In the illustrative example, the first tunnel 162a is established between the eNB 110a and the SGW 114. Accordingly, the first tunnel 162a includes a first tunnel endpoint 164a corresponding to an S1-U address of the eNB 110a (eNB S1-U address), and a second tunnel endpoint 166a corresponding to an S1-U address of the SGW 114 (SGW S1-U address). Likewise, the second tunnel 162b includes a first tunnel endpoint 164b corresponding to an S5-U address of the SGW 114 (SGW S5-U address), and a second tunnel endpoint 166b corresponding to an S5-U address of the PGW 120 (PGW S5-U address).

In at least some embodiments, the first tunnel solution 160 is referred to as a two tunnel solution, e.g., according to the General Packet Radio System (GPRS) Tunneling Protocol User Plane (GTPv1-U based), as described in 3GPP specification TS 29.281. It is understood that one or more tunnels are permitted between each set of tunnel end points. For example, each subscriber can have one or more tunnels, e.g., one for each PDP context that they have active, as well as possibly having separate tunnels for specific connections with different quality of service requirements.

An example of a second tunnel solution 150 includes a single or direct tunnel 152 between tunnel endpoints 154 and 154. In the illustrative example, the direct tunnel 152 is established between the eNB 110a and the PGW 120, without subjecting packet transfers to processing related to the SGW 114. Accordingly, the direct tunnel 152 includes a first tunnel endpoint 154 corresponding to the eNBS1-U address, and a second tunnel endpoint 156 corresponding to the PGW S5-U address. Packet data received at either end can be encapsulated into a payload and directed to the corresponding address of the other end of the tunnel. Such direct tunneling avoids processing, e.g., by the SGW 114 that would otherwise relay packets between the same two endpoints, e.g., according to a protocol, such as the GTP-U protocol.

Figure 2:
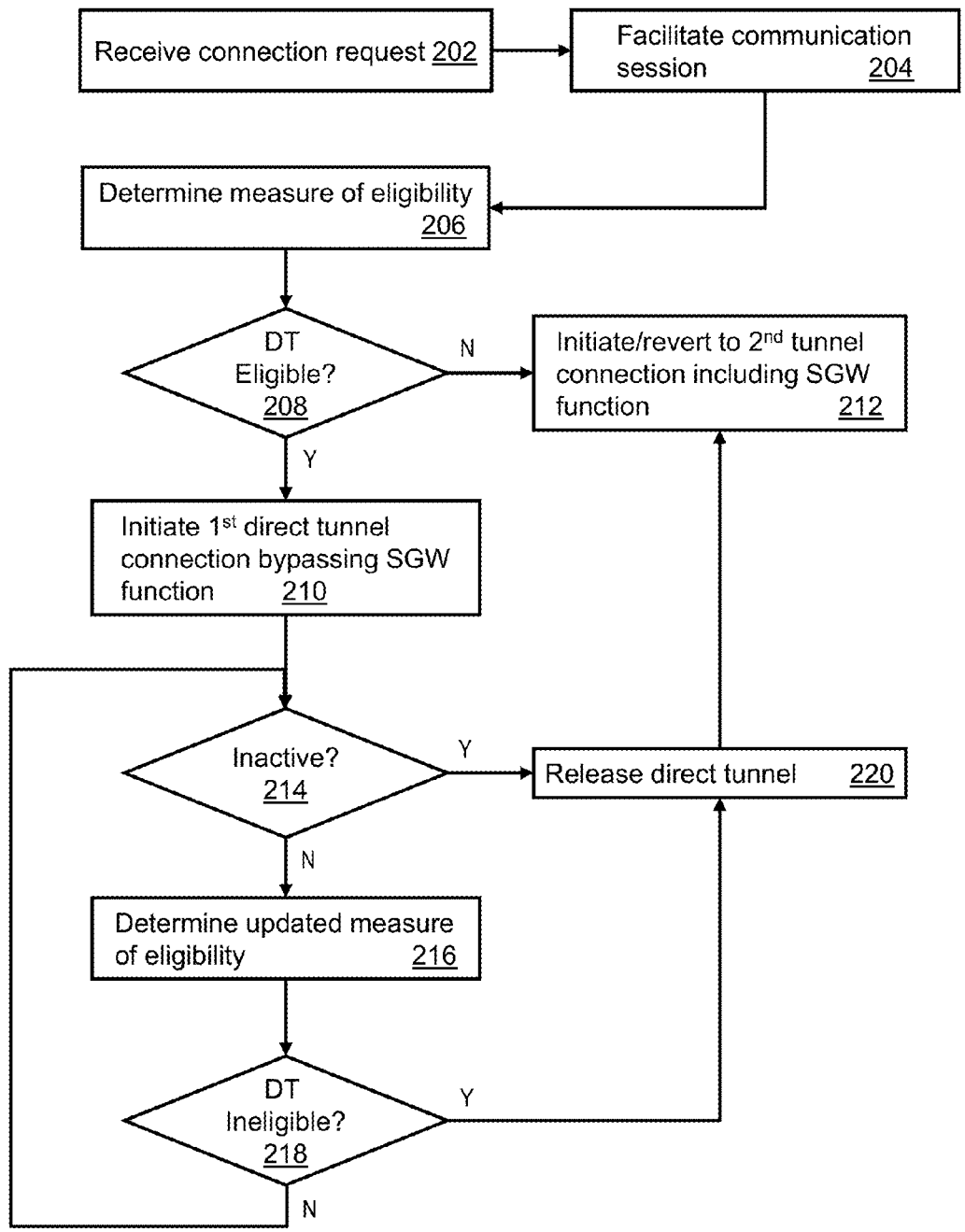
FIG. 2 depicts an illustrative embodiment of a method used in portions of the communication network described in FIG. 1.

FIG. 2 depicts an illustrative embodiment of a process 200 used in portions of the communication network described in FIG. 1. The process 200 includes receiving a connection request at 202. The connection request can be received by a network entity, such as an MME 112 (FIG. 1). The request can be for establishment of a network connection including a tunnel solution, e.g., a direct tunnel, between a wireless communication device, e.g., UE 108 (FIG. 1) and a packet data network, e.g., the Internet 140 (FIG. 1). A communication session, e.g., an IP session, is facilitated at 204. For example, the MME 112 facilitates a communication session between an eNB 110a in wireless communication with the wireless communication device and the packet data network. The facilitating of the network connection can include an exchange of control signaling between a second network device and a packet data network gateway, wherein the second network device includes a serving gateway function, and wherein the second network device, e.g., an SGW 114 (FIG. 1) operates in an evolved packet core network of a long term evolution system, e.g., network 100 (FIG. 1).

A measure of eligibility for the requested tunnel solution is determined at 206. Such a determination can be accomplished, e.g., by the MME 112. Eligibility can be determined according to various measures, such an identity of a subscriber, or equipment of a subscriber. Direct tunneling service can be offered, e.g., as a preferred service, which users may subscribe to for a fee. Other measures of eligibility can relate to mobility. Establishing eligibility according to mobility can be particularly useful for direct tunnel solutions that bypass a serving gateway function. As the serving gateway function supports mobility of user equipment, application of a direct tunnel connection could lead to complications and/or inefficiencies. For example, UE 108 mobility during a direct tunnel configuration may be possible, but may require additional overhead, e.g., signaling between network entities than would otherwise be required using the serving gateway function. Accordingly, to conserve network resources, e.g., bandwidth, processing availability and so forth, direct tunnels can be discouraged or blocked for requests that do not adhere to certain restrictions of mobility.

Some examples of measures of eligibility include, without limitation, one or more of an international mobile subscriber identity (IMSI) number series, an international mobile station equipment identity (IMEI) range, a list of access point names (APNs). An IMSI is generally used to identify a user of a cellular network and is a unique identification associated with all cellular networks. The IMEI is a number, usually unique, to identify user equipment, such as 3GPP (i.e., GSM, UMTS and LTE) and iDEN mobile phones, as well as some satellite phones. An APN can refer to a name of a gateway between a mobile network and another computer network, e.g., any of the external networks 106, such as the Internet 140.

Such eligibility measures as the IMSI number series, the IMEI range and/or the list of APNs can be preconfigured or otherwise stored in one or more of the network entities, such as the MME 112 (FIG. 1). As such parameters are discoverable by the MME 112 during the normal course of network operations, the MME 112 can compare one or more of such values to any preconfigured values to determine eligibility. Any measures of eligibility, such as the examples provided herein, can be used alone or in combination with each other, and/or in combination with other measures of eligibility, such as mobility triggers.

In general, the MME can control the usage of a direct-tunneling solution by one or more of IMSI number series, IMEI ranges, APN lists, local breakout policy for roamers, or mobility triggers, alone or in combination. By way of illustrative example, the MME 112 can use at least the following criteria to establish and release direct tunnels:

an IMSI Number Series configured in the MMEs;
an IMEI Range configured in the MMEs;
a direct-tunnel-allowed APN list configured in the MMEs;
a combination of the IMSI number series and the direct-tunnel-allowed APN list;
a combination of the IMEI range and the direct-tunnel-allowed APN list;
a combination of the IMSI number series and the IMEI range;
a combination of the IMSI number series, the IMEI range and the direct-tunnel-allowed APN list;
a combination of the IMSI number series, the direct-tunnel-allowed APN list, and a mobility trigger;
a combination of the IMEI range, the direct-tunnel-allowed APN list, and a mobility trigger;
a combination of the IMSI number series, the IMEI range, and the mobility trigger; and
a combination of the IMSI number series, the IMEI range, the direct-tunnel-allowed APN list, and the mobility trigger.

For inbound roamers, when a local breakout is allowed, then the UE and its corresponding local breakout APN may be eligible for direct-tunnel solutions in the serving network according to the techniques disclosed herein.

A determination is made at 208 as to eligibility related to the requested tunnel solution. To the extent the requested tunnel solution is eligible for a direct tunnel, a first direct tunnel connection is established at 210, bypassing the serving gateway function. To the extent that the requested tunnel solution is ineligible for the direct tunnel, an alternative or second tunnel connection, such as a two-tunnel, e.g., GTP, tunnel connection is established at 212. In particular, the second tunnel connection includes the serving gateway function, e.g., by passing through the SGW 114 network entity and being subjected to processing by the SGW 114.

While operating according to the direct tunnel solution, operations of the mobile communications device are monitored to determine periods of activity and/or inactivity. To the extent that the activity falls below some predetermined threshold, e.g., measured in minutes or hours, it can be concluded at 214 that the mobile communications device is inactive. To the extent that the mobile communications device having previously established a direct tunnel connection is inactive, the direct tunnel is released at 220 and a secondary, e.g., two-tunnel, solution is established at 212 including the serving gateway function.

To the extent the mobile communications device having previously established a direct tunnel is not inactive, as concluded at 214, an updated measure of eligibility is determined at 216. The updated measure of eligibility can include a mobility trigger as discussed herein. A determination is made at 218 as to continued eligibility related to the requested tunnel solution. To the extent that the determination concludes ineligibility, the direct tunnel is released at 220 and a secondary, e.g., two-tunnel, solution is established at 212 including the serving gateway function. To the extent, however, that the determination concludes not ineligible, the process continues to periodically monitor activity and eligibility according to 214-218 as disclosed above.

Mobility triggers can include a measure of handover events, e.g. X2 and/or S1-type handovers associated with mobility in an active mode. Such triggers can depend upon a measure of such handover events, e.g., within a predetermined time period, and comparing the measured results to a mobility trigger threshold. Such a mobility trigger threshold can be defined as a number of handover events per hour. Alternatively or in addition, mobility in an idle-mode can be measured, e.g., according to tracking area updates (TAUs) as might be monitored. The measurement can be performed, e.g., within a predetermined time period, and the results compared to an idle-mode mobility trigger threshold, e.g. T events/hour. An example of an MME configured to provide the logic implementing such mobility triggers is described below.

If a measure of TAU events, e.g., a quantity, rate and/or average, for a UE in an idle state exceeds a threshold, T, events per hour, the operator can be provided with an option to either allow or disallow the UE to establish any direct-tunnels for its packet data network connections when it is transitioned from the idle state to the active state, regardless of the MME configured direct-tunnel criteria, e.g., based on the IMSI, IMEI and APN list. In at least some embodiments, a "null" value or suitable override indicator can be provided as a selectable and/or configurable option for the operator. The override indicator indicates, e.g., that no action should be taken regardless of the "T" value.

If a measure of handover events, e.g., a quantity, rate and/or average, for a UE in the active state exceeds the threshold, HO, of events per hour, the operator can be provided with an option that either triggers or does not trigger the UE packet data network connections in a direct-tunnel mode to fall back to a 2-tunnel mode, regardless of the MME configured direct-tunnel criteria, e.g., based on the IMSI, IMEI and APN list. In at least some embodiments, a "null" value or suitable override indicator can be provided as a selectable and/or configurable option for the operator. The override indicator indicates, e.g., that no action should be taken regardless of the measured "HO" value.

In some embodiments, an opposite logic is provided for a TAU trigger such that responsive to a measure of TAU events for a UE in the idle state that is below the T events per hour, e.g., for some configurable duration, the operator can be provided with an option to either allow or disallow the UE to establish direct tunnels for its packet data network connections when it is transitioned from the idle state to the active state, despite MME configured direct-tunnel criteria based on one or more of the IMSI, IMEI and APN list. Once again, in at least some embodiments, a "null" value or suitable override indicator can be provided as a selectable and/or configurable option for the operator. The override indicator indicates, e.g., that no action should be taken regardless of the measured "T" value.

In some embodiments, an opposite logic is provided for an active mode handover trigger. Thus, if a measure of active mode handover events, e.g., X2 and/or S1 handovers, for a UE in the active state is below a threshold of HO events per hour, e.g., for some configurable duration, the operator can be provided with an option that either triggers or does not trigger the UE packet data network connections in the 2-tunnel mode to be promoted to a direct-tunnel mode, despite MME configured direct tunnel criteria, e.g., based on one or more of the IMSI, IMEI and APN list. In at least some embodiments, a "null" value or suitable override indicator can be provided as a selectable and/or configurable option for the operator. The override indicator indicates, e.g., that no action should be taken regardless of the measured "HO" value In at least some embodiments, one or more measures of mobility can be reset in response to one or more events. For example, the MME can reset one or more mobility event counters to "0" in response to, e.g., a UE state transition from an EPS connection management "ECM_Connected" state to an EPS mobility management "EMM_Idle" state and/or registers with the MME initially during an attach procedure and/or during an IRAT TAU and/or during an inter-MME procedure. Accordingly, a frequency of mobility events can be evaluated from a clean starting point. In at least some embodiments, a default action is "direct tunnel may trigger" when the UE is in the idle state after all counters are reset to "0" and one of the IMSI and/or IMEI and/or APN list criteria for direct tunnel are met.

In at least some embodiments, mobility triggers, such as the example triggers disclosed herein, can be used in a combined manner. For example, if a UE exceeds the T (TAU) events per hour in a measurement period during an idle mode, the UE will not be eligible for direct tunnel configuration when the UE initially transitions from idle to active. But during the active period, if the measured handover events (e.g., combined X2 and S1 handover events) events are less than the HO trigger threshold (handovers) per hour, then direct-tunnel promotion can be triggered during the active state. Also, if at some time later the mobility events (e.g., handovers) exceed the HO threshold, the UE is transitions to the 2-tunnel solution. However, immediately after the UE is transitioned back to idle mode, the default setting will take effective immediately, e.g., direct tunnel, can trigger, if one of the IMSI and/or IMEI and/or APN list criteria for 4G-DT is met.

Figure 3A:
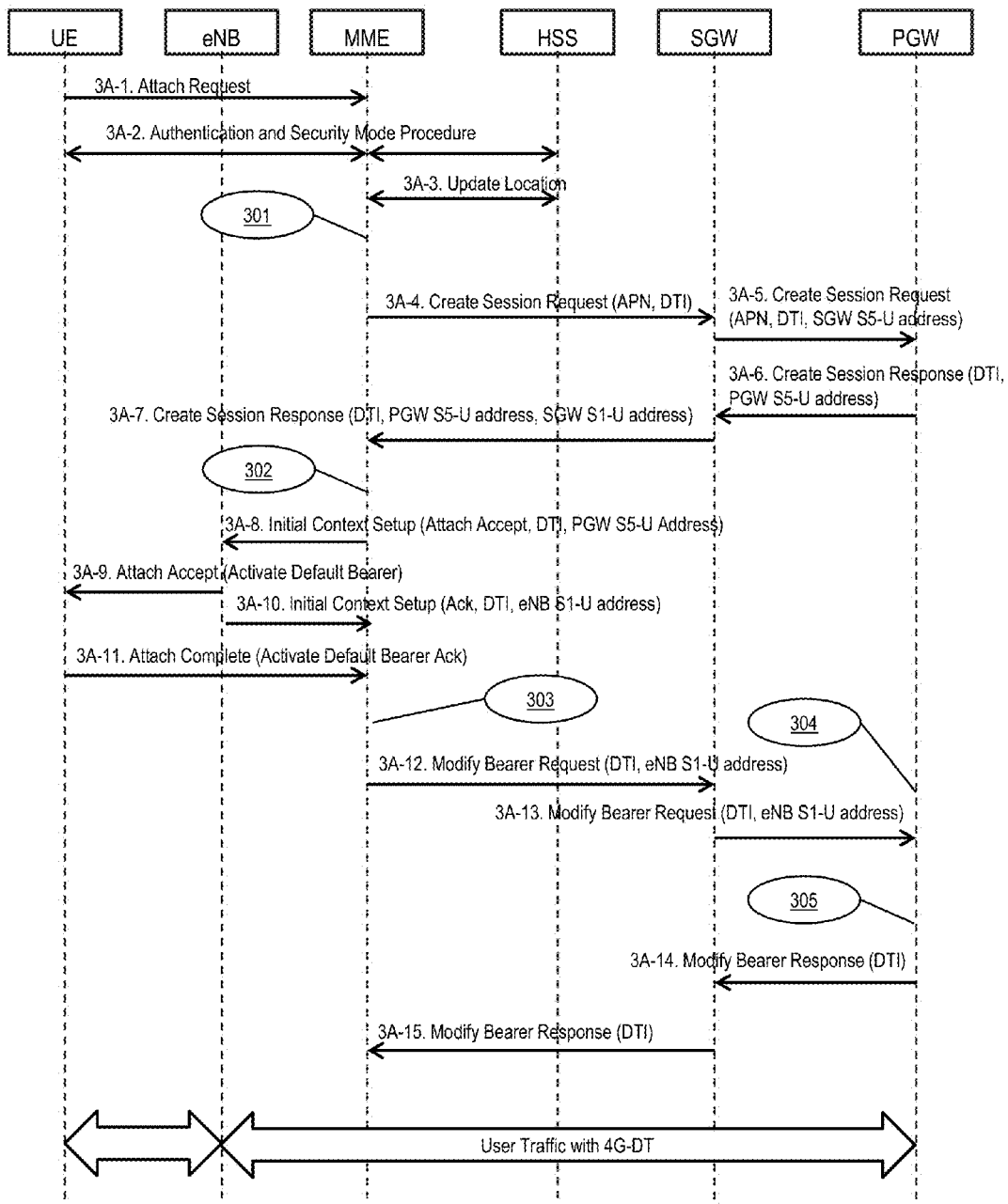
FIGS. 3A-3J depict illustrative embodiments of signaling diagrams to exchange packet-oriented information.

FIG. 3A-3J depict illustrative embodiments of signaling diagrams to exchange packet-oriented information. In particular, FIG. 3A illustrates an embodiment of a high level call flow associated with a UE attach process. In the illustrative example, the UE 108 (FIG. 1) sends an attach-request message to the MME 112 at step 3A-1. At step 3A-2, the UE 108, the MME 112 and the HSS 116 complete an authentication procedure and security mode procedure. At step 3A-3, the MME 112 completes an update location procedure in cooperation with the HSS 116. At 301, the MME 112 performs an analysis, e.g., based on locally configured direct-tunnel policies, to determine whether the user, e.g., a subscriber associated with the UE 108, is eligible for direct-tunnel services and whether the APN associated with the attach-request message is eligible for direct-tunnel services. Reference to the phrase direct-tunnel or direct tunnel as used herein refers to tunneling configurations, services and so-forth that allow user data packets, e.g., in a user or data plane, to bypass the mobility anchor, namely, the SGW 114. Thus, user data packets can be routed in a direct sense between the eNB 110a and the PGW 120, without being subjected to any processing, even relay processing, at the SGW 114.

Each SGW 114 is generally associated with one or more eNBs 110, either directly (S1 interface) or indirectly according to a mesh network by way of an intervening eNB 110 (S1 and X2 interfaces). A set of SGW 114 and MME 112 nodes can serve a common area called an MME-SGW pool. Thus, UEs 108 in a cell controlled by one eNB 110a can be shared between multiple core network nodes.

In the scenario presented in the illustrative example, it is assumed that the subscription allows for direct-tunnel services. Next, at step 3A-4, the MME 112 sends a create-session-request message to the selected SGW 114, indicating that a direct-tunnel solution is being applied in response to the attach request message. Such indications that a direct-tunnel is being applied can include identification of a direct-tunnel indicator (DTI), e.g., a bit or bit sequence, a variable, or a setting of some other suitable indicator or flag.

It is understood that error recovery rules, e.g., general packet radio service (GPRS) tunneling protocols (GTP) error recover rules, as may be related to the direct-tunnel can be applied. The SGW 114 allocates its S5-U address towards the PGW 120, which can be used for situations in which a direct-tunnel setup is not successful in the PGW 120 allowing for reversion to a so-called two-tunnel solution, e.g., once again routing user plane, e.g., user data, packets through the SGW 114. At step 3A-5, the SGW 114 sends a create session request to the PGW 120. The create session request includes a DTI flag and the S5-U address of the SGW 114.

Presuming that the PGW 120 sets up a direct-tunnel configuration successfully, the PGW 120 responds at step 3A-6 by providing a create-session-response message including its PGW S5-U address and a suitable indication, such as a DTI flag, that a direct-tunnel configuration is being established. To the extent that the direct-tunnel setup is unsuccessful in the PGW 120, however, the PGW 120 does not include the DTI flag in the create-session-response message. The SGW 114 checks whether direct-tunnel is allowed by the PGW 120 in the create-session-response message, e.g., that the message includes a DTI indication. If the direct-tunnel configuration is allowed, the SGW 114 proceeds to prepare for the direct-tunnel configuration. Presuming once again that the direct-tunnel setup is successful in the PGW 120, there will be no user traffic on the SGW S5-U address as the user data packets, being handled by the direct tunnel, will bypass the SGW 114. At step 3A-7, the SGW 114 sends a create-session-response message to the MME 112 including a DTI flag, or other suitable indication. The create-session-response message also includes the PGW S5-U address of the PGW 120 and the SGW S1-U address of the SGW 114. In the illustrative embodiment, the S1-U address of the SGW 114 remains allocated and can be used, e.g., when reverting to a backup tunnel or other data packet transfer solution, e.g., two-tunnel, solution that does not bypass the SGW 114.

After deciding to proceed with a direct-tunnel configuration at 302, the MME 112, at step 3A-8, sends an initial context-setup message to the eNB 110a. The initial context-setup message includes a DTI flag, the PGW S5-U address, and the attach-accept message. At step 3A-9, the eNB 110a forwards the attach-accept message to the UE 108. At step 3A_10, the eNB 110a acknowledges an initial context setup, with the DTI flag and the S1-U address of the eNB 110a. Note, at this step, that the eNB 110a can send user layer traffic to the PGW S5-U address, the PGW 120, having received the DTI indicator and the PGW-S5-U address from the MME 112 at step 3A-8.

The UE 108 sends an attach-complete message to the MME 112 at step 3A-11. At the stage, the PDN context records of the MME 112 should record the necessary information for both a direct-tunnel solution and an alternate solution, such as a two-tunnel solution. Therefore, MME 112 should store, retain or otherwise remember: (i) the current tunnel status (e.g., direct-tunnel vs. two-tunnel), the S1-U address of the eNB 110a in step 3A-10, the SGW S1-U address and the PGW S5-U address received in step 3A-7.

The MME 112 sends a modify-bearer-request message to the SGW 114 at step 3A-12 to inform the SGW 114 that the direct-tunnel setup was successful in the eNB 110a (i.e., determined by the DTI flag) and the eNB S1-U address. At 304, the SGW 114 can store, retain or otherwise remember, e.g., in its UE Context: the current tunnel status (direct-tunnel vs. two-tunnels), the SGW S1-U address (step 3A-7), the SGW S5-U address (step 3A-5) and the PGW S5-U address (step 3A-6).

Such retained address information can be used when falling back or otherwise reverting to an alternative, e.g., 2-tunnel, solution when necessary. The SGW 114, at step 3A-13, sends the modify-bearer-request message to the PGW 120, including a DTI flag indicating that a direct tunnel is being used by the eNB 110a, the message also including the eNB S1-U address. At 305, the PGW 120 will store, retain or otherwise keep the current tunnel status (i.e., direct tunnel versus 2-tunnels), the SGW S5-U address (step 3A-5) and the PGW S5-U address (step 3A-6) in the UE session context. This address information can be used when falling back to the alternative, e.g., 2-tunnel, solution when necessary.

At this point, the PGW 120 can initiate a direct tunnel for the transfer of user data packets after having received the eNB S1-U address and the DTI flag in the modify-bearer request. The PGW 120 acknowledges the modify-bearer request message at step 3-14. The PGW 120 can initiate transferring user data directly between the PDN and the eNB 110a. At step 3A-15, the SGW 114 forwards the modify-bearer-acknowledgment message to the MME 112. The SGW 114 can prepare for the direct-tunnel configuration, as it will no longer see any uplink traffic or downlink traffic at this moment. At this point, the eNB 110a can begin sending user data traffic, e.g., uplink traffic, directly to the PGW 120. Likewise, the PGW 120 can begin sending user traffic, e.g., downlink traffic, directly to the eNB 110a. User data now is directly flowing between the eNB 110a and the PGW 120 as indicated by the horizontal arrow, without having to be routed through the mobility anchor, e.g., the SGW 114.

Figure 3B:
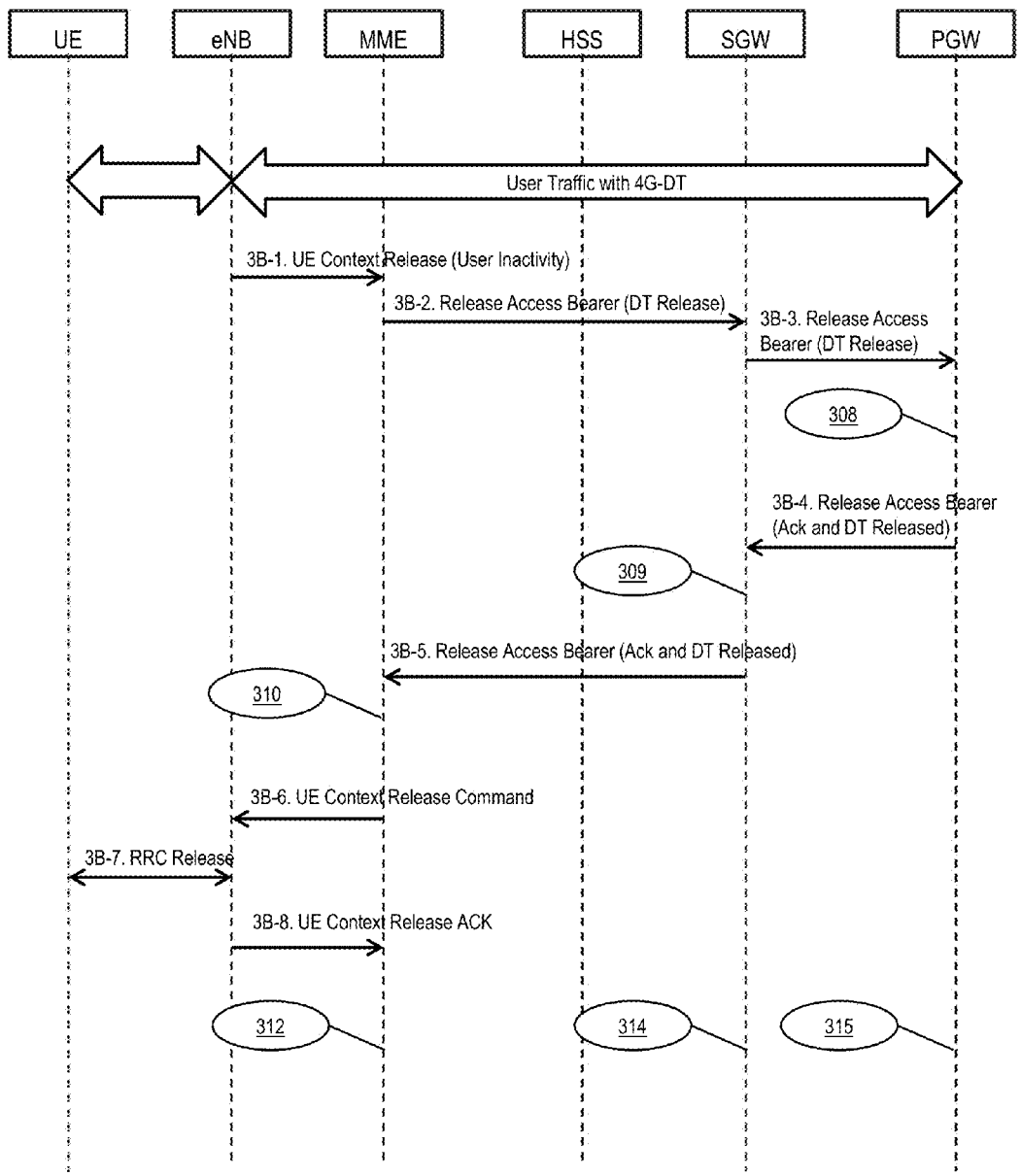

FIG. 3B illustrates an embodiment of a high-level call flow 300B associated with an S1 release in relation to a direct-tunnel configuration. At step 3B-1, the eNB 110a sends a UE-context-release-request message, e.g., in response to user inactivity. At step 3B-2, the MME 112 checks the PDN context and determines that the direct tunnel is active currently. So, the MME 112 sends release-access-bearer message to the SGW 114 with a direct tunnel release indication. At step 3B-3, the SGW 114 determines that, in its PDN context, the current active session is using a direct tunnel and the MME 112 requests a release of the direct tunnel. In response, the SGW 114 sends a release-access-bearer-request message to the PGW 120 with a direct tunnel release indication. The release-access-bearer-request message from the SGW 114 to the PGW 120 is a new message on the S5 interface, which is used to bring the PGW 120 back to a fallback or secondary solution, such as the 2 tunnel solution, so that the DDN message can be triggered by the SGW 114 if there is user data from the PGW 120, when the UE 108 is in the idle state.

At 308, The PGW 120 deletes the eNB 110a S1-U address from the PDN context, sets the tunnel status as "2-tunnels" and prepares to send the future user data traffic to the saved SGW 114 S5-U address. The PGW 120 gets the release-access-bearer-request message with release direct-tunnel indication. At step 3B-4 the PGW 120 then sends the release-access-bearer-acknowledgment message to the SGW 114 with the indication of the user data being released. The release-access-bearer-acknowledgement message sent from the PGW 120 to the SGW 114 is a new message on the S5 interface. With the direct tunnel released, the SGW 114 can revert to the 2-tunnel solutions, in order to trigger the DDN message when UE 108 goes to the idle state.

At 309, the SGW 114 sets the tunnel status for the PDN context as 2-tunnels and initiates listening to its SGW S5-U address for the user data traffic from the saved PGWs S5-U address. The SGW 114 puts the UE 108 into an idle state. Then, it deletes the eNB S1-U address and acknowledges the MME 112 by sending the release-access-bearer-acknowl-edgment message to the MME 112, at step 3B-5, with an indication that the direct-tunnel is being released.

At 310, the MME 112 sets the tunnel status for the PDN context to "2-tunnels," deletes the eNB S1-U address and continues remembering the SGW S1-U address and the PGW S5-U address. The MME 112 puts the UE 108 into an idle state and sends the UE 108 context release command to the eNB 110a at step 3B-6. At step 3B-7, the eNB 110a releases the radio resource control (RRC) resources, and at step 3B-8, the eNB 110a acknowledges the UE 108 context release.

In the UE 108 idle state, the MME 112, at 312, stores, retains or otherwise remembers the SGW S1-U address and PGW S5-U address in the PDN Context. The SGW 114, at 314, stores, retains or otherwise remembers SGW S1-U address, SGW S5-U address and PGW S5-U address in the PDN Context. The PGW 120, at 315, stores, retains or otherwise remembers SGW S5-U address and PGW S5-U address in the PDN Context. All of the nodes associated with data connections are configured to store, retain or otherwise remember the tunnel status in the PDN contexts.

Figure 3C:
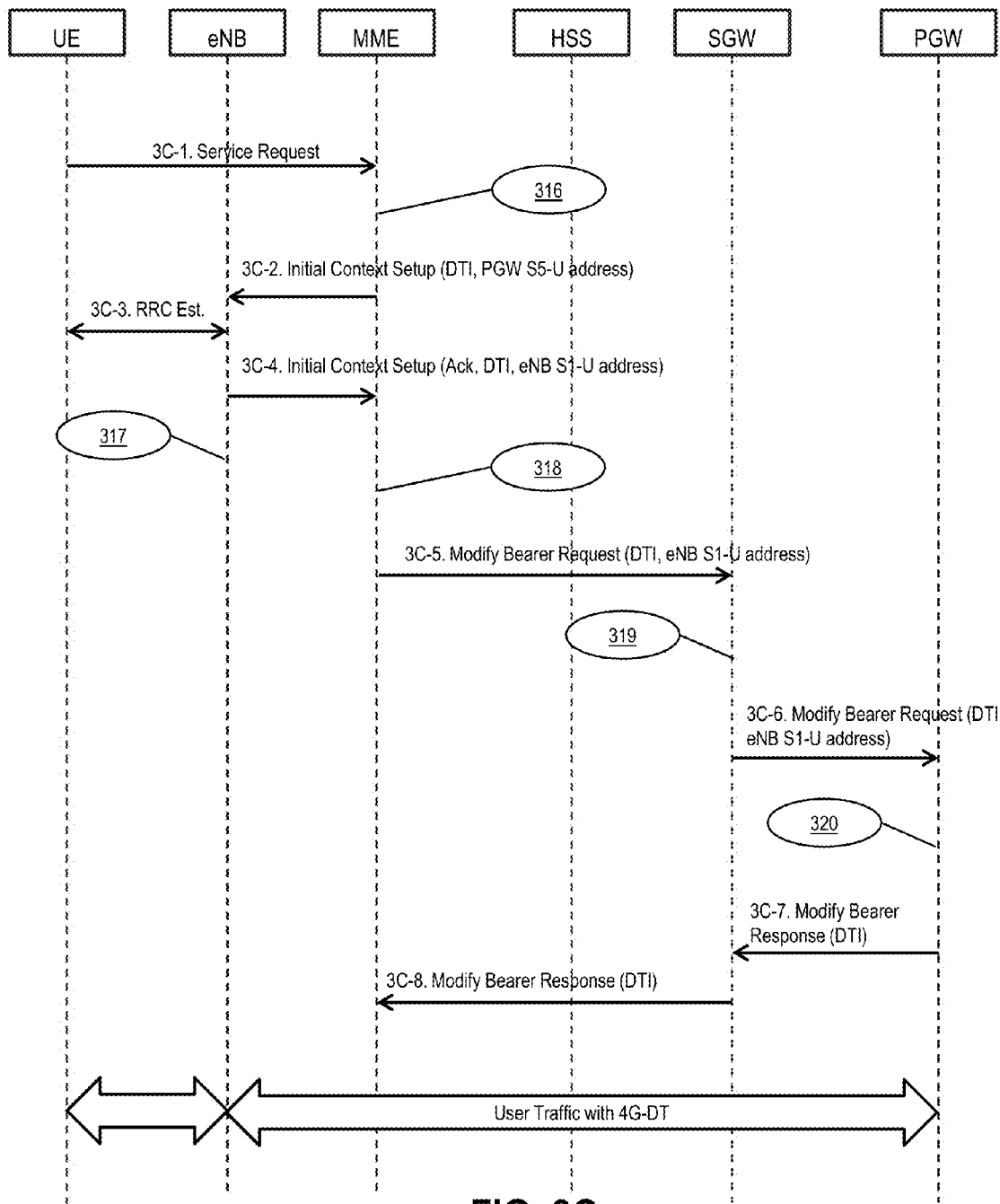

FIG. 3C illustrates an embodiment of a high level call flow service request 300C for a direct-tunnel configuration. At step 3C-1, the UE 108 sends a service-request message to the MME 112 since it has data to send and receive. The UE 108 indicates which PDN context has the data to transmit. At 316, the MME 112 verifies that the UE 108 and the PDN context are eligible for direct tunnel service. For example, the MME 112 can conduct an analysis, e.g., based on direct-tunnel policies, to determine if the subscriber and the requested APN are eligible for direct-tunnel service. Presuming that the subscriber and requested APN are eligible for direct-tunnel service, the MME 112, at step 3C-2, sends the initial UE-context-setup-request message to the eNB 110a with the direct tunnel indication and the saved PGW S5-U address.

At step 3C-3, the eNB 110a sets up the RRC resource and data radio resources over the air. At step 3C-4, the eNB 110a acknowledges that the direct tunnel has been setup successfully and the eNB S1-U address in the initial-UE-context-setup-acknowledgment message. At 317, the eNB 110a could send the uplink user traffic to the PGW 120. At 318, the MME 112 sets the current tunnel status as "direct tunnel" and remembers the eNB S1-U address in addition to the SGW S1-U address and the PGW S5-U address in the PDN Context. At step 3C-5, the MME 112 sends a modify-bearer-request message with the direct-tunnel indication and the eNB S1-U address to the SGW 114.

At 319, the SGW 114 sets the current tunnel status as "direct tunnel" and continues remembering the SGW S1-U address and the SGW S5-U address and the PGW S5-U address. Then the SGW 114, at step 3C-6, sends the modify-bearer-request message to the PGW 120, with the direct tunnel indication and the eNB S1-U address to the PGW 120. At 320, the PGW 120 sets the current tunnel status as "direct tunnel" and remembers the eNB S1-U address, the SGW S5-U address and the PGW S5-U address. The PGW 120 completes the direct-tunnel configuration and sends a modify-bearer-response message, at step 3C-7, to the SGW 114 with the direct-tunnel indication.

At step 3C-8, the SGW 114 forwards the modify-bearer-acknowledgment message to the MME 112. The SGW 114 can prepare for a direct-tunnel configuration, since it will not see the uplink traffic and the downlink traffic at this moment. At this point, the eNB 110a can send uplink traffic directly to the PGW 120, without any relay through or processing by the SGW 114. Likewise, the PGW 120 can send downlink traffic directly to the eNB 110a.

Figure 3D:
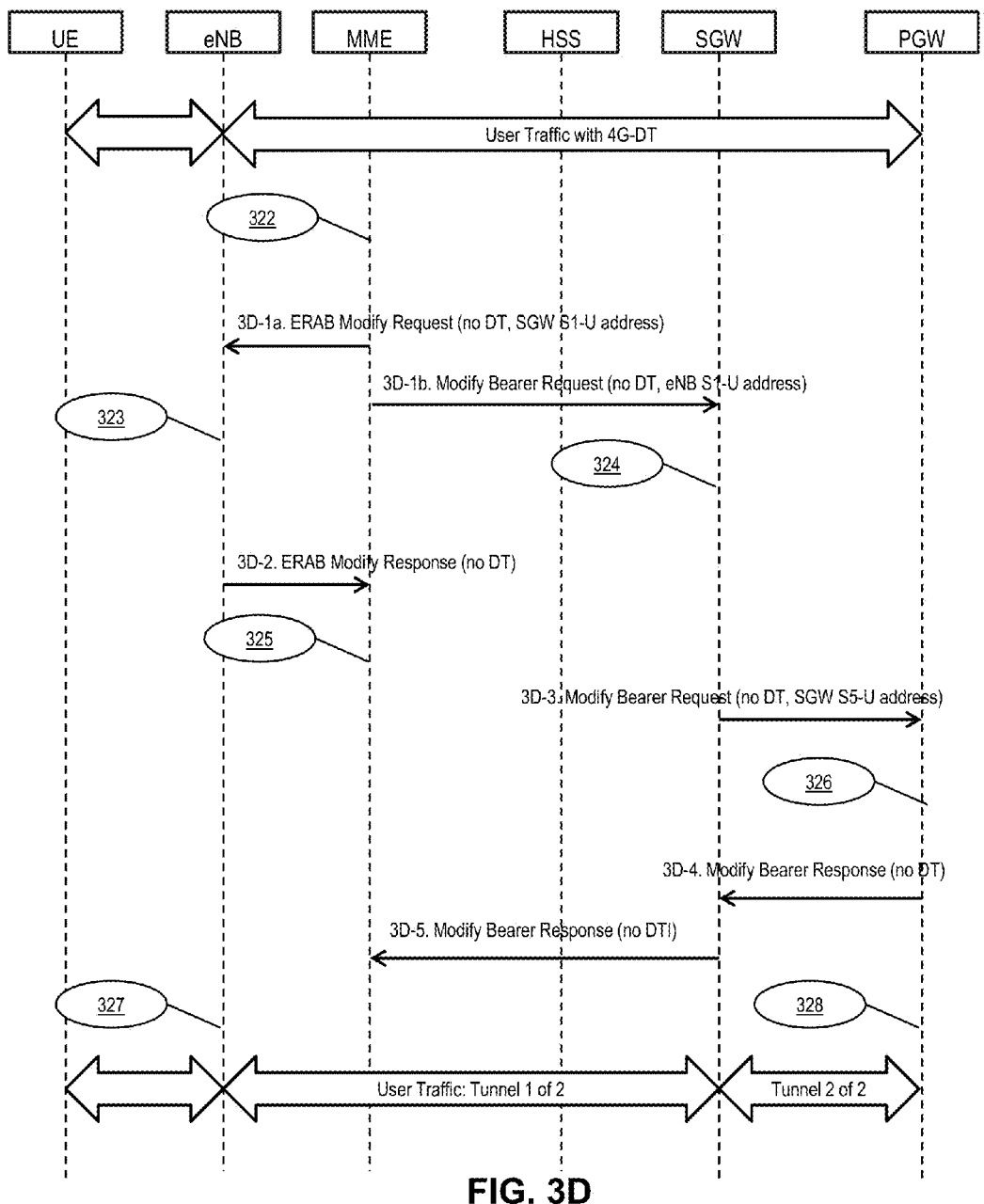

FIG. 3D illustrates an embodiment of a high level call flow 300D associated with a change from a direct tunnel to a two-tunnel configuration. Initially, uplink traffic is flowing directly from the eNB 110a to the PGW 120 and downlink traffic is flowing directly from the PGW 120 to the eNB 110a as indicated by the horizontal arrow between the eNB 110a and PGW 120. A mobility event trigger is received at 322. The MME 112 determines that the 2-tunnel solution must be used at this time. MME 112 retrieves the SGW S1-U address and eNB S1-U address in the saved PDN Context. At step 3D-1a, the MME 112 uses the ERAB Modification Procedure to inform the eNB 110a that the direct-tunnel configuration cannot be used anymore and a 2-tunnel configuration must be implemented, according to the SGW S1-U interface address. In response, the SGW 114, at 323, switches the uplink traffic to the SGW S1-U address. In the meantime, at step 3D-1b, the MME 112 uses a modify-bearer procedure on the S11 interface to inform the SGW 114 that the direct-tunnel cannot be used anymore and that the 2 tunnel solution must be implemented, e.g., according to the eNB S1-U address.

At step 3D-2, the eNB 110a modifies the transport configuration for the user traffic and begins to send the uplink traffic to the SGW S1-U address. Note that, at this step, the eNB 110a should expect the downlink traffic from either the SGW 114 or the PGW 120. The eNB sends the ERAB-modify-response message to the MME 112 and acknowledges that the direct-tunnel configuration has been removed. At 325, the MME 112 sets the current tunnel status as "2 tunnels," and retains the eNB S1-U address, in addition to the SGW S1-U address and the PGW S5-U address in the PDN context.

Once the SGW 114 receives the S11 modify-bearer-request message with indication of canceling the direct-tunnel configuration and the eNB S1-U address, the SGW 114, at 324, changes the tunnel status to "2 tunnels" and start listening to the S1-U addresses (i.e., eNB/SGW pair) for uplink traffic and listening to the S5-U addresses (i.e., SGW/PGW pair) for downlink traffic. In addition, the SGW shall forward any received UL traffic from the eNB to the PGW S5-U address. Then the SGW 114, at step 3D-3, sends modify-bearer-request message to the PGW 120 with a canceling direct tunnel indication and its SGW S5-U address.

At 326, the PGW 120 sets the current tunnel status as "2 tunnels," deletes the eNB S1-U address and remembers the SGW S5-U address and the PGW S5-U address. The PGW 120 is ready to send the downlink traffic to the SGW S5-U address and is ready to receive the uplink traffic from the SGW S5-U address. At step 3D-4, the PGW sends a modify-bearer-response message to the SGW 114, with the acknowledgment of ending the direct tunnel configuration. Note that, at this step, the PGW 120 can send the downlink traffic to the SGW S5-U address and should handle all received uplink traffic for this UE 108 which could be from either the eNB 110*a* or from the SGW 114 for at least a short period of time.

At step 3D-5, the SGW 114 sends a modify-bearer-response message to the MME 112, with the acknowledgment of ending the direct tunnel configuration. As a result of this procedure, the user data flows through two tunnels (i.e., an S1-U tunnel between the eNB 110*a* and the SGW 114 and an S5-U tunnel between the SGW 114 and the PGW 120).

Figure 3E:
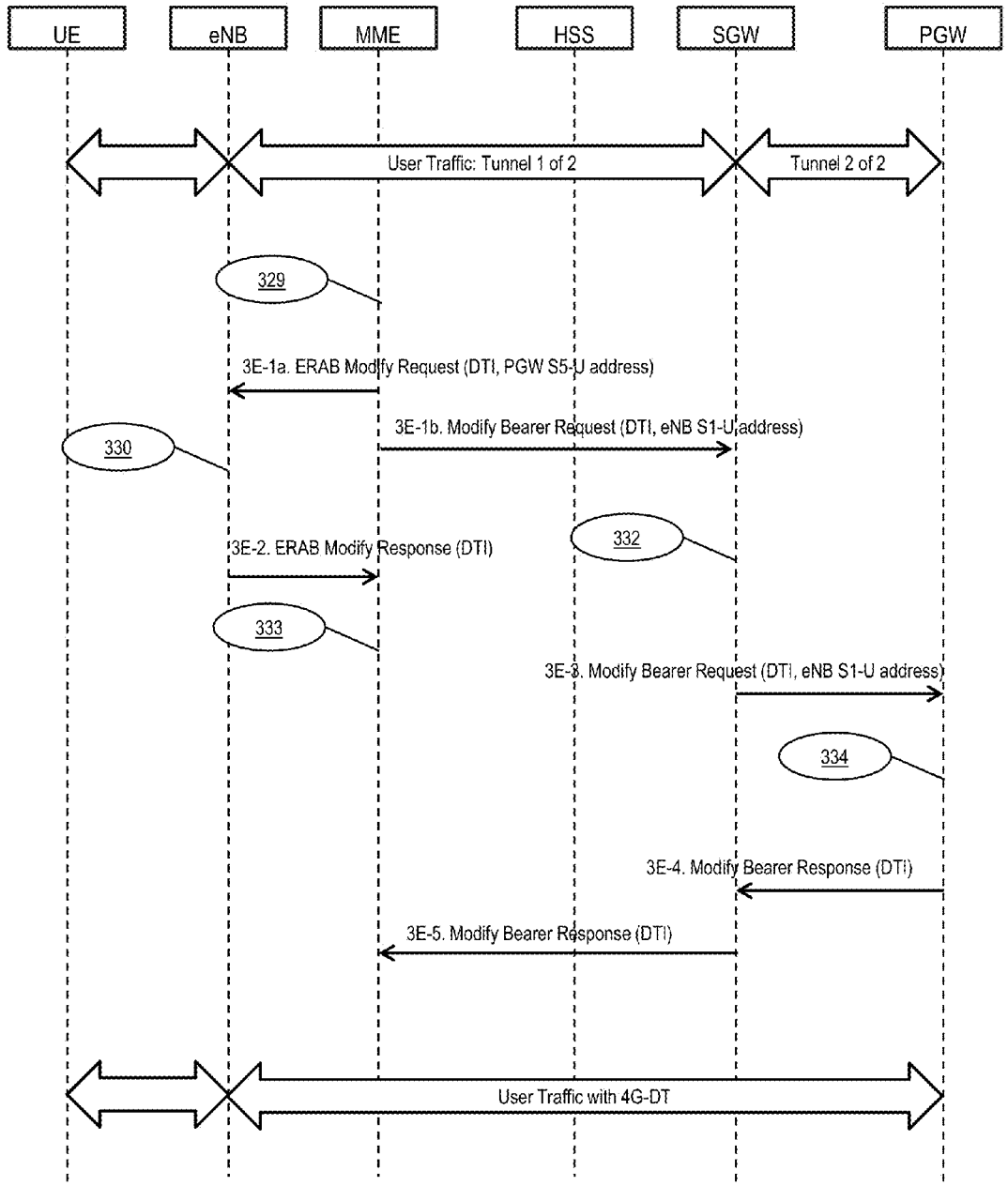

FIG. 3E illustrates an embodiment of a high level call flow 300E associated with a change from a two-tunnel configuration to a direct tunnel configuration. Initially, user data flows through two tunnels, e.g., an S1-U tunnel between the eNB 110*a* and the SGW 114 and an S5-U tunnel between the SGW 114 and the PGW 120. An event trigger is received at 329. The MME 112, in response, determines that the direct-tunnel solution can be used at this time, and retrieves the PGW S5-U address and eNB S1 U address retained in a saved PDN Context.

At step 3E-1*a*, the MME 112 uses the ERAB-modification-procedure to send a message to the eNB 110*a*, with information indicating that the direct-tunnel should be used, and with the PGW S5-U address. In the meantime, the MME 112, at step 3E-1*b*, uses a modify-bearer-procedure on the S11 interface to inform the SGW 114 that the direct tunnel should be used with the eNB S1-U address.

At 330, the eNB 110*a* modifies the transport configuration for the user traffic and begins to send the uplink traffic to the PGW S5-U address. Note that, at this step, the eNB 110*a* should expect the downlink traffic could be from either SGW 114 or the PGW 120. At step 3E-2, the eNB 110*a* sends the ERAB modify response to the MME 112 and acknowledges that the direct-tunnel configuration has been accomplished.

Once the SGW 114 receives the S11 modify-bearer-request message with indication of establishing direct-tunnel configuration and the eNB S1-U address, the SGW 114, at 332, changes the tunnel status to "direct tunnel" and prepares for the direct-tunnel scenario. The SGW 114 should still forward any received uplink traffic from the eNB 110*a* to the PGW S5-U address and forward any received downlink traffic from PGW 120 to eNB 110*a*. Then the SGW 114 sends a modify-bearer-request message, at step 3E-3, to the PGW 120 with a direct-tunnel indication and the eNB S1-U address.

At 334, the PGW 120 sets the current tunnel status as "direct tunnel," adds the eNB S1-U address and retains the SGW S5-U address and the PGW S5-U address. The PGW 120 is ready at this point to send the downlink traffic to the eNB S1-U address and is also ready to receive uplink traffic from the eNB S1-U address. Then the PGW 120 sends a modify-bearer-response message, at step 3E-4, to the SGW 114, with the acknowledgment of starting the direct-tunnel configuration. Note that, at this step, the PGW 120 can send the downlink traffic to the eNB S1 U address and should handle all received uplink traffic for this UE 108 which could be from either the eNB 110*a* or from the SGW 114 for at least a short period of time. At step 3E-5, the SGW 114 sends a modify-bearer-response message, with the acknowledgment of starting the direct-tunnel configuration, to the MME 112. Now, the user data flows through the direct-tunnel between the eNB 110*a* and the PGW 120.

Figure 3F:
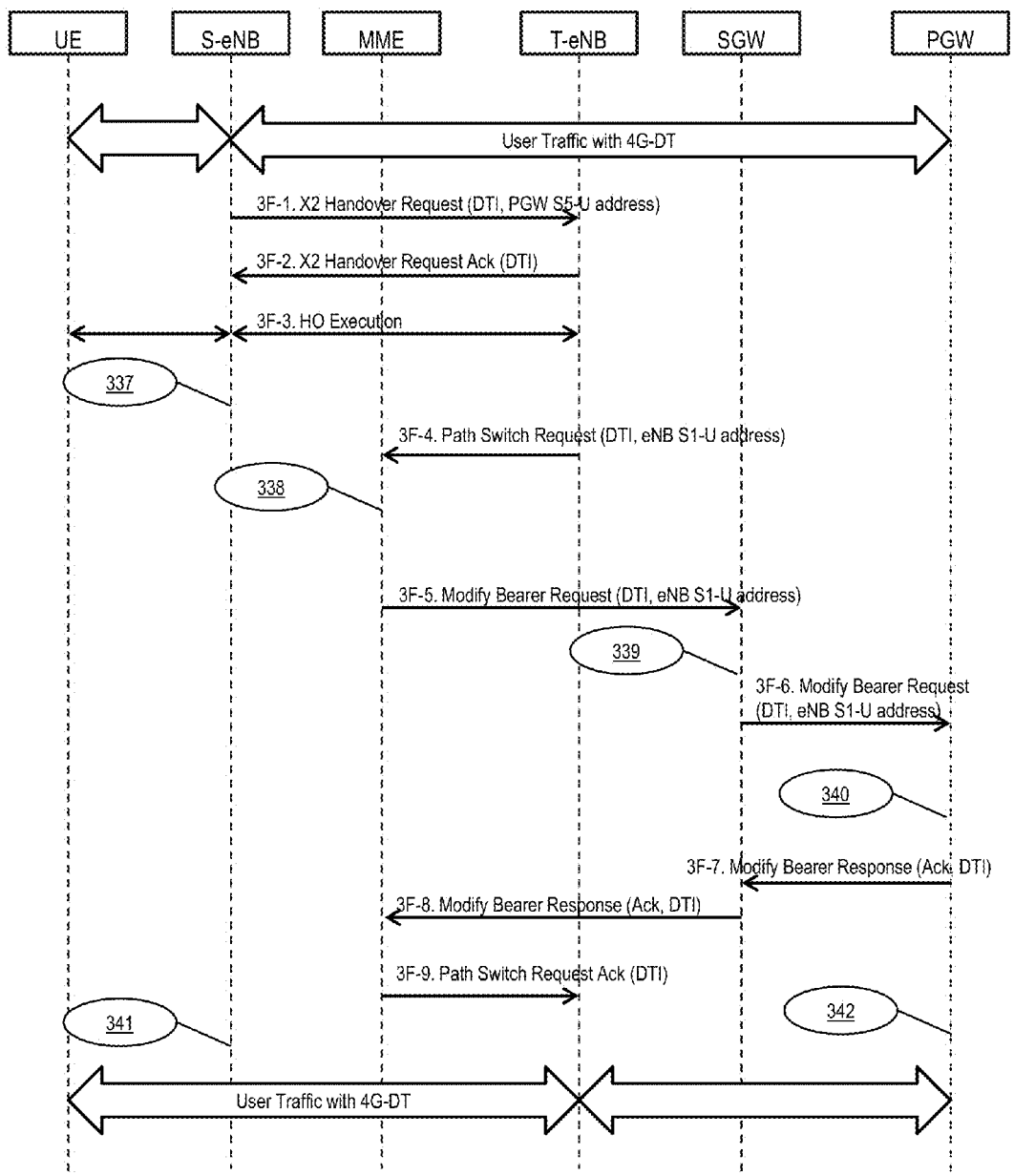

FIG. 3F illustrates an embodiment of a high level call flow 300F associated with an X2 handover change under a direct tunnel configuration without change of an associated serving gateway. Initially, user data flows through a direct tunnel between a source eNB (S-eNB) and a PGW. The S-eNB detects that it is necessary to execute an X2 handover process to transition wireless connectivity to the UE through a S-eNB to a target eNB (T-eNB), the source and target eNBs having an X2 interface therebetween. In response, the S-eNB, at step 3F-1, sends an X2 handover request message to the T-eNB. The X2 handover request message includes a direct-tunnel indication and the PGW S5-U address.

After it allocates the necessary resources, the T-eNB, at step 3F-2 sends an acknowledgement message to the S-eNB, responding to the X2-handover request and the direct-tunnel configuration. At step 3F-3, an X2 handover process is executed. Once the T-eNB acquires the UE, it can start to forward the uplink traffic from UE 108 to the PGW directly, since it already knows the PGW S5-U address. At step 3F-4, The T-eNB sends a path-switch-request message to the MME 112, indicating that the X2 handover process has completed and that the direct-tunnel configuration is being used on the T-eNB and the target eNB S1-U address.

At 337, the MME 112 continues marking the tunnel status as "direct-tunnel" and saves the new eNB S1-U address in an updated PDN context. The MME decides that the SGW does not need to be changed and sends a modify-bearer-request message to the corresponding SGW, at step 3F-5, with the direct-tunnel indication and the new eNB S1-U address. At 339, the SGW saves the new eNB S1-U address and keeps the tunnel status as "direct-tunnel." At step 3F-6, the SGW sends a modify-bearer-request message with the direct-tunnel indication and the new eNB S1-U address to the PGW.

At 340, the PGW replaces the old eNB S1-U address, e.g., associated with the S-eNB, with the new eNB S1-U address, e.g., associated with the T-eNB, and switches the direct-tunnel to the new eNB S1-U address. At step 3F-7, PGW sends a modify-bearer-response message with the direct-tunnel indication to the SGW. The SGW is ready to operate in the direct-tunnel mode and sends a modify-bearer-response message, at step 3F 8, to the MME 112, with the direct-tunnel indication. At step 3F-9, the MME 112 acknowledges a path-switch-request message to the new eNB 110*b*, while maintaining the direct-tunnel indication. User traffic is transferred between the UE and the PGW, by way of the T-eNB as illustrated.

Figure 3G:
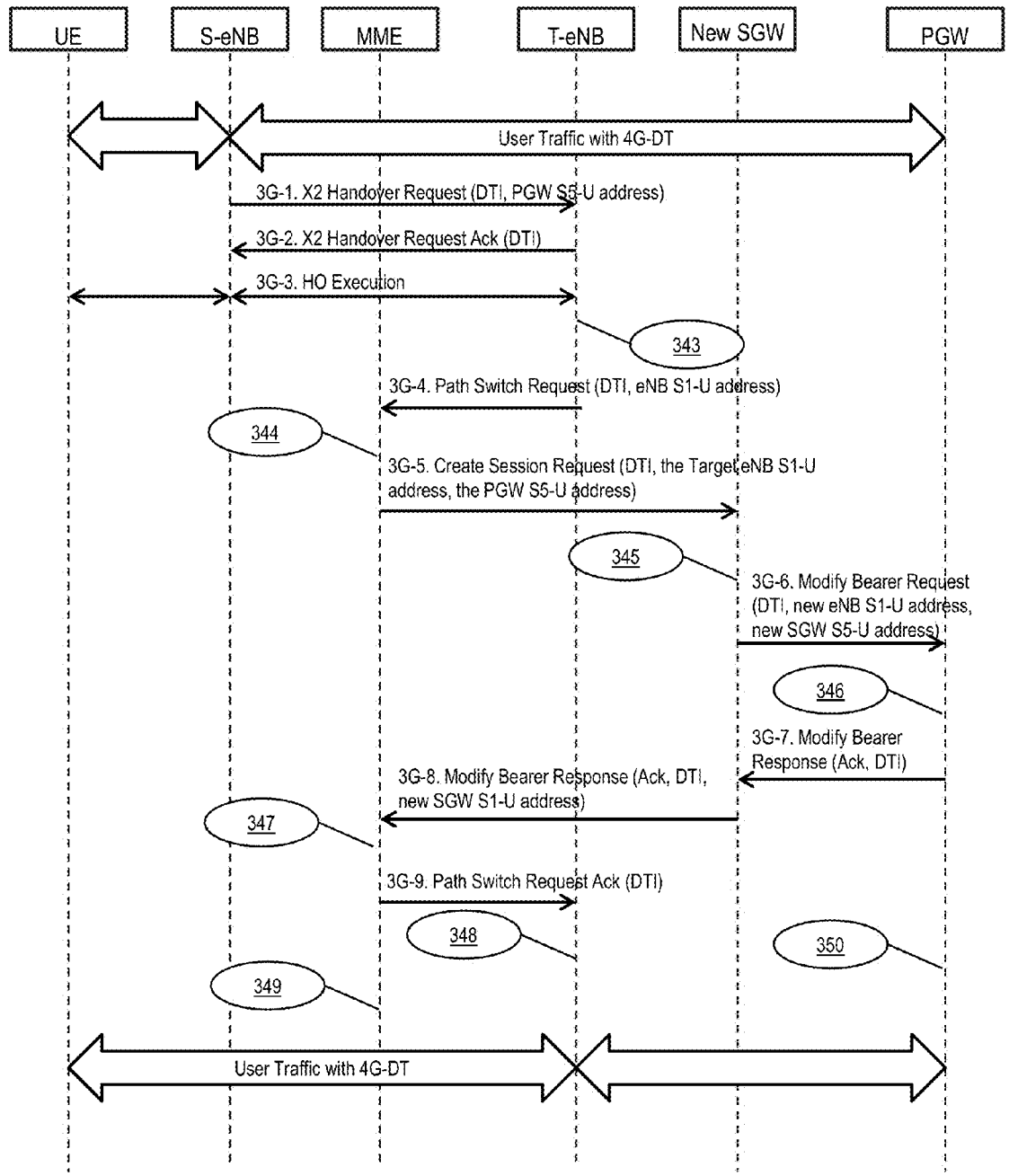

FIG. 3G illustrates an embodiment of a high level call flow 300G associated with an X2 handover change under a direct tunnel configuration with a change of an associated serving gateway. Initially, user traffic transferred between the UE and the PGW, by way of an S-eNB as illustrated, including a direct tunnel configuration between the S-eNB and the PGW. The S-eNB detects that it is necessary to execute an X2 handover procedure and sends an X2 handover request message to the T-eNB at step 3G-1, the request message including a direct-tunnel indication and the PGW S5-U address. After allocating the necessary resources, the T-eNB sends a message to the S-eNB at step 3G-2, acknowledging the X2 handover request message and the direct-tunnel indication.

The X2 handover procedure is executed at step 3G-3. Once the T-eNB acquires the UE, it can start to forward the uplink traffic from UE to the PGW directly at 343 by way of the direct-tunnel configuration, without being subjected to processing by the SGW, since the T-eNB already knows the PGW S5-U address.

At step 3G-4, the T-eNB sends the path-switch-request message to the MME, indicating that an X2 handover procedure has completed and that the direct-tunnel configuration is being used on the T-eNB, and also providing the target eNB S1 U address. At 344, the MME continues marking the tunnel status as "direct tunnel" and saves the new eNB S1-U address in a PDN context. The MME decides that the current SGW needs to be changed and, at step 3G-5, sends the create-session-request message to a New SGW (not shown in FIG. 1), with a direct tunnel indication and the new eNB S1-U address and the PGW S5-U address.

At 345, the New SGW saves the new eNB S1-U address and the PGW S5-U address, and retains the tunnel status as "direct tunnel." The New SGW also allocates the SGW S1 U address and the SGW S5-U address. Then, at step 3G-6, the New SGW sends a modify-bearer-request message with the direct tunnel indication and the new eNB S1-U address and the new SGW S5-U address to the PGW. At 346, the PGW replaces the source eNB S1-U address with the target eNB S1-U address and switches the direct tunnel to the target eNB S1 U address. The PGW saves the new SGW S5-U address in the PDN context. At step 3G-7, the PGW sends a modify-bearer-response message with the direct-tunnel indication to the New SGW. At this point, the PGW can send the downlink traffic to the T-eNB directly.

The New SGW is ready to operate in the direct-tunnel mode and, at step 3G-8, sends a modify-bearer-response message to the MME, with the direct tunnel indication and the new SGW S1-U address. The MME, in turn, saves the new SGW S1-U address in the PDN context at 348 and at step 3G-9, sends a message to the T-eNB acknowledging the path-switch-request message, with the direct-tunnel indication. At 349, the MME releases resources in the old SGW 114 and the S-eNB.

Figure 3H:
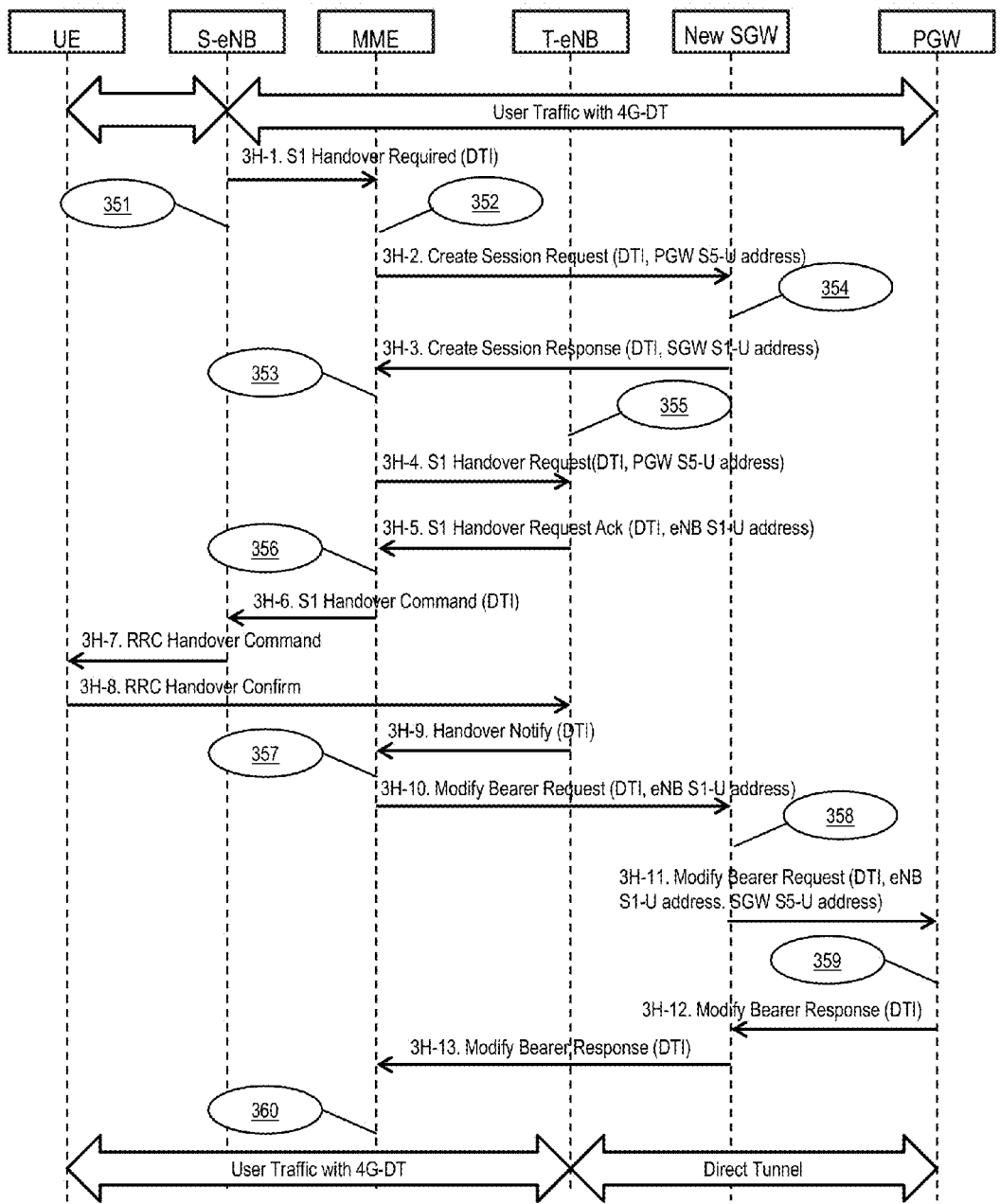

FIG. 3H illustrates an embodiment of a high level call flow 300H associated with an S1 handover change under a direct tunnel configuration with a change of an associated serving gateway. Initially, uplink traffic is flowing directly from a S-eNB to the PGW and downlink traffic is flowing directly from the PGW to the S-eNB as indicated by the horizontal arrow between a source eNB and a PGW.

The S-eNB detects that it is necessary to execute a S1 handover procedure and, at step 3H-1, sends an S1 handover required message to the MME, with the direct-tunnel indication. Note at 351 that the S-eNB does not have to send the PGW S5-U address in this message, since MME PDN context should have this address. At 352, the MME decides that the SGW 114 relocation is required and, at step 3H-2, sends a create-session-request message to a New SGW, with the direct-tunnel indication and the PGW S5-U address. At 354, the New SGW sets the tunnel status as "direct tunnel" and saves the PGW S5-U address for the PDN context. The New SGW allocates the SGW S1-U address and SGW S5-U address. At step 3H-3, the New SGW replies with a create-session-response message to the MME, with the direct tunnel indication and the SGW S1-U address.

At 353, the MME sets the current tunnel status as "direct tunnel" and saves the new SGW S1-U address in an updated PDN context. The MME retrieves the PGW S5 U address. At step 3H-4, the MME sends a S1 handover-request message to the T-eNB, with the direct tunnel indication and the PGW S5-U address. At 355, the T-eNB saves the PGW S5-U address and prepares to send the uplink traffic to the PGW S5-U address. At step 3H-5, the T-eNB sends a message acknowledging the S1 handover request after allocating the necessary resources. The acknowledgement includes a direct tunnel indication and the new eNB S1-U address.

At 356, the MME sets the current tunnel status as "direct tunnel" and saves the new eNB S1-U address in the PDN context. At step 3H-6, the MME sends an S1 handover command to the S-eNB along with a direct-tunnel indication. At step 3H-7, the S-eNB executes an RRC handover, sending an RRC handover command to the UE. At step 3H-8, the UE re-tunes the radio and accesses the T-eNB. Once the UE acquires the T-eNB, it sends an RRC handover-confirmation message to the T-eNB. Once the T-eNB acquires the UE, it can start to forward the uplink traffic from UE to the PGW directly, since it already knows the PGW S5-U address. The T-eNB confirms the handover, at step 3H-9, by sending an S1 handover notification message to the MME, with the direct-tunnel indication. At 357, the MME decides to continue using the direct-tunnel configuration. At step 3H-10, the MME sends a modify-bearer-request message to the New SGW, indicating that an S1 handover has been completed and that the direct-tunnel configuration is being used on the T-eNB, the message also including the target eNB S1-U address.

At 358, the SGW 114 saves the new eNB S1-U address and keeps the tunnel status as "direct tunnel." At step 3H-11, the SGW 114' sends a modify-bearer-request message to the PGW. The message includes a direct-tunnel indication, the new eNB S1-U address and the SGW S5-U address. At 359, the PGW replaces the source eNB S1-U address with the target eNB S1-U address and switches the direct tunnel to the target eNB S1-U address. At step 3H-12, the PGW saves the new SGW S5-U address and sends a modify-bearer-response message with the direct tunnel indication to the SGW 114. At step 3H-13, the New SGW is ready to operate in the direct-tunnel mode and sends modify-bearer-response message to the MME, with the direct tunnel indication. At 360, the MME cleans up the resources in the S-eNB and the associated resources in the old SGW 114. At this point, the T-eNB can send uplink traffic to the PGW and the PGW can send downlink traffic to the T-eNB.

Figure 3I:
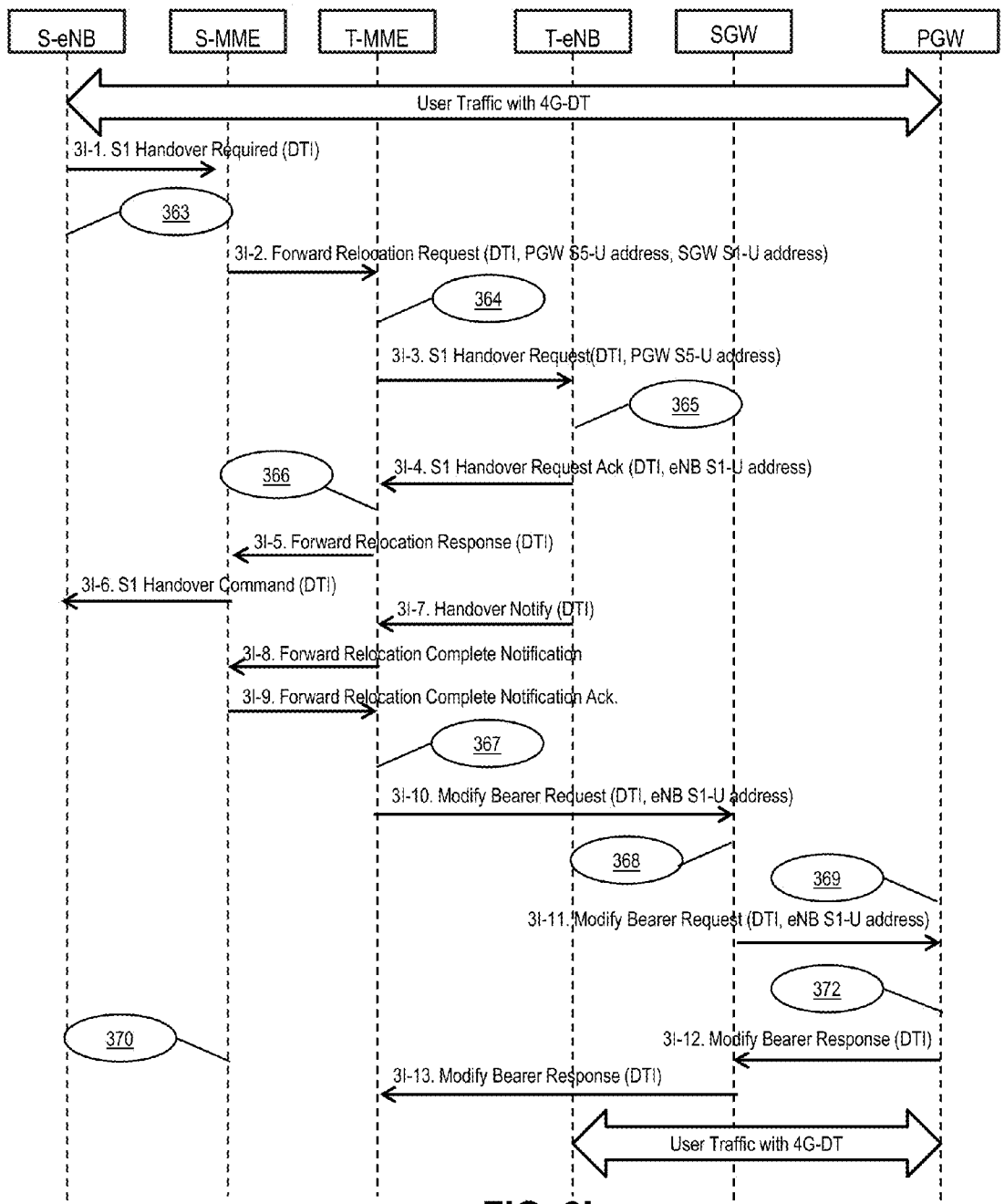

FIG. 3I illustrates an embodiment of a high level call flow 300I associated with an inter-MME handover change under a direct tunnel configuration without a change of an associated serving gateway. Initially, uplink traffic is flowing directly from a S-eNB to the PGW and downlink traffic is flowing directly from the PGW to the S-eNB as indicated by the horizontal arrow between the S-eNB and a PGW.

At step 3I-1, a source eNB (S-eNB) detects that it is necessary to execute an S1 handover and sends an S1 handover required message to a source MME (S-MME), the message including a direct tunnel indication. Note at 363 that the S-eNB does not have to send the PGW S5-U address in this message, since the S-MME PDN context should have this address. At step 3I-2, the S-MME decides that an MME relocation is required. The S-MME sends a forward relocation request message to the target MME (T-MME), with a direct tunnel indication, the SGW S1-U address and the PGW S5-U address. At 364, the T-MME sets the current tunnel status as "direct tunnel" and saves the PDN context, including the SGW S1-U address and PGW S5-U address. The T-MME decides that an SGW relocation is not required. The T-MME decides to try the direct tunnel and retrieves the PGW S5-U address. At step 3I-3, the T-MME sends an S1 handover-request message to the target eNB (T-eNB), with the direct tunnel indication and the PGW S5-U address.

At 365, the T-eNB saves the PGW S5-U address and prepares to send the uplink traffic to PGW S5-U address. At step 3I-4, T-eNB acknowledges the S1 handover-request with the direct-tunnel indication and the new eNB S1-U address, after it allocates the necessary resources. At 366, the T-MME sets the current tunnel status as "direct tunnel" and saves the new eNB S1-U address in the PDN context. The T-MME acknowledges the forward-relocation-request message, at step 3I-5, by sending a forward-relocation-response message to the S-MME, with the direct tunnel indication. At step 3I-6, the Source MME sends the S1 handover command to the S-eNB with the direct tunnel indication.

Once the T-eNB acquires the UE (not shown), it can start to forward the uplink traffic from UE to the PGW directly, since it already knows the PGW S5-U address. The T-eNB confirms the handover, at step 3I-7, by sending the S1 handover-notification message to the T MME, with the direct tunnel indication. At step 3I-8, the T-MME sends a forward-relocation-complete-notification message to the S-MME. At step 3I-9, the S-MME sends a forward-relocation-complete-notification acknowledgement message to the T-MME. At 367, the T-MME decides to continue using the direct-tunnel configuration.

At step 3I-10, The MME sends a modify-bearer-request message to the SGW, indicating that an S1 handover has completed and the direct-tunnel configuration is used on the T-eNB and the T-eNB S1-U address. At 368, the SGW saves the target eNB S1-U address and keeps the tunnel status as "direct tunnel." At step 3I-11, the SGW sends a modify-bearer-request message with the direct-tunnel indication and the target eNB S1-U address to the PGW. At 372, the PGW sets the current tunnel status as "direct tunnel," switches to the target eNB S1-U address. The PGW is ready to send the downlink traffic to the target eNB S1-U address and is ready to receive uplink traffic from the target eNB S1-U address.

At step 3I-12, The PGW replaces the source eNB S1-U address with the target eNB S1-U address and switches the direct tunnel to the target eNB S1-U address. The PGW sends a modify-bearer-response message with the direct tunnel indication to the SGW. At step 3I-13, the SGW is ready to operate in the direct tunnel mode and sends a modify-bearer-response to the MME, with the direct-tunnel indication. At 370, the S-MME cleans up the resources in the S eNB and the associated resources in the SGW.

Figure 3J:
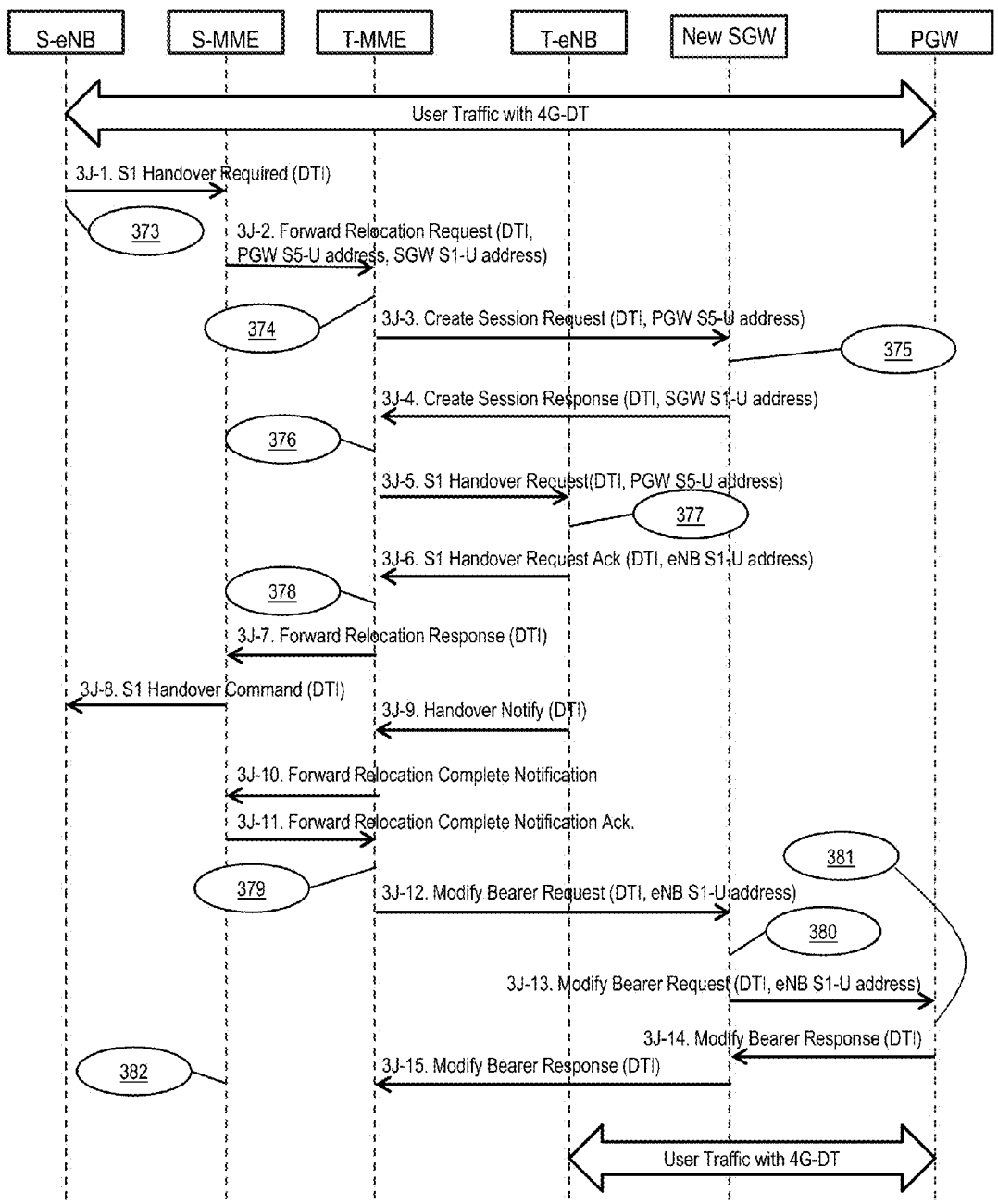

FIG. 3J illustrates an embodiment of a high level call flow 300J associated with an inter-MME handover change under a direct tunnel configuration with a change of an associated serving gateway. Initially, uplink traffic is flowing directly from a source eNB (S-eNB) to the PGW and downlink traffic is flowing directly from the PGW to the S-eNB as indicated by the horizontal arrow between the S-eNB and the PGW.

At step 3J-1, the S-eNB detects that it is necessary to execute a S1 handover and sends an S1 handover required message to a source MME (S-MME), with the direct-tunnel indication. Note at 373 that the S-eNB does not have to send the PGW S5-U address in this message, since the S-MME PDN context should have this address. The S-MME decides that an MME relocation is required. At step 3J-2, the S-MME sends a forward-relocation-request message to a target MME (T-MME), with a direct-tunnel indication, the SGW S1-U address and the PGW S5-U address.

At 374, the T-MME sets the current tunnel status as "direct tunnel" and saves the PDN context, including the current SGW S1-U address and PGW S5-U address. The T-MME decides that a relocation of the SGW to a New SGW is also required and, at step 3J-3, sends a create session request message to the New SGW, with the direct-tunnel indication and the PGW S5-U address. At 375, the New SGW sets the tunnel status as "direct tunnel" and saves the PGW S5-U address for the PDN context. Then the New SGW allocates the SGW S1-U address and SGW S5-U address. At step 3J-4, the New SGW sends a create session response message to the T-MME, with a direct tunnel indication and the new SGW S1-U address.

At 376, the T-MME sets the current tunnel status as "direct tunnel" and saves the new SGW S1-U address in the PDN context. The T-MME decides to try the direct tunnel and retrieves the PGW S5-U address. At step 3J-5, the T-MME sends an S1 handover request message to the T-eNB, with a direct-tunnel indication and the PGW S5-U address. At 377, the T-eNB saves the PGW S5-U address and prepares to send the uplink traffic to the PGW S5-U address. At step 3J-6, the T-eNB acknowledges the S1 handover request with the direct-tunnel indication and the new eNB S1-U address, after it allocates the necessary resources.

At 378, the T-MME sets the current tunnel status as "direct tunnel" and saves the new eNB S1-U address in the PDN context. Then it acknowledges the forward relocation request message, at step 3J-7, by sending a forward relocation response message to the S-MME, with the direct-tunnel indication. At step 3J-8, the S-MME sends the S1 handover command to the source eNB with the direct-tunnel indication. At step 3J-9, once the T-eNB acquires the UE (FIG. 1), it can start to forward the uplink traffic from the UE to the PGW directly, since it already knows the PGW S5-U address. The T-eNB confirms the handover by sending an S1 handover notify message to the T-MME, with the direct-tunnel indication. At step 3J-10, the T-MME sends a forward relocation complete notification message to the S-MME. At step 3J-11, The S-MME sends a forward relocation complete notification acknowledgement message to the T-MME.

At 379, the T-MME decides to continue using the direct-tunnel solution. At step 3J-12, T-MME sends a modify bearer request message to the New SGW, indicating that an S1 handover has been completed and that the direct-tunnel configuration is being used on the T-eNB and the T-eNB S1-U address. At 380, the New SGW saves the new eNB S1-U address and keeps the tunnel status as "direct tunnel." At step 3J-13, the New SGW sends a modify bearer request message with a direct-tunnel indication, the new eNB S1-U address and the new SGW S5-U address to the PGW.

At 381, the PGW replaces the old eNB S1-U address with the new eNB S1-U address and switches the direct tunnel to the new eNB S1-U address. The PGW saves the new SGW S5-U address and, at step 3J-14, sends a modify bearer response message with a direct-tunnel indication to the New SGW. At step 3J-15, the New SGW is ready to operate in the direct tunnel mode and sends modify bearer response message to the MME, with the direct-tunnel indication. At 382, the S-MME cleans up the resources in the S-eNB and the associated resources in the former SGW. Consequently, the T-eNB can send uplink traffic to the PGW and the PGW can send downlink traffic to the T-eNB.

In at least some embodiments, e.g., due to the complexity of the Inter-RAT handover into the LTE network, the MME can be configured to establish the initial session with a 2-tunnel solution. Once the IRAT handover is completed and the T-MME has verified the subscription, the T-MME can trigger the active session to switch or otherwise change to a direct-tunnel solution.

Figure 4:
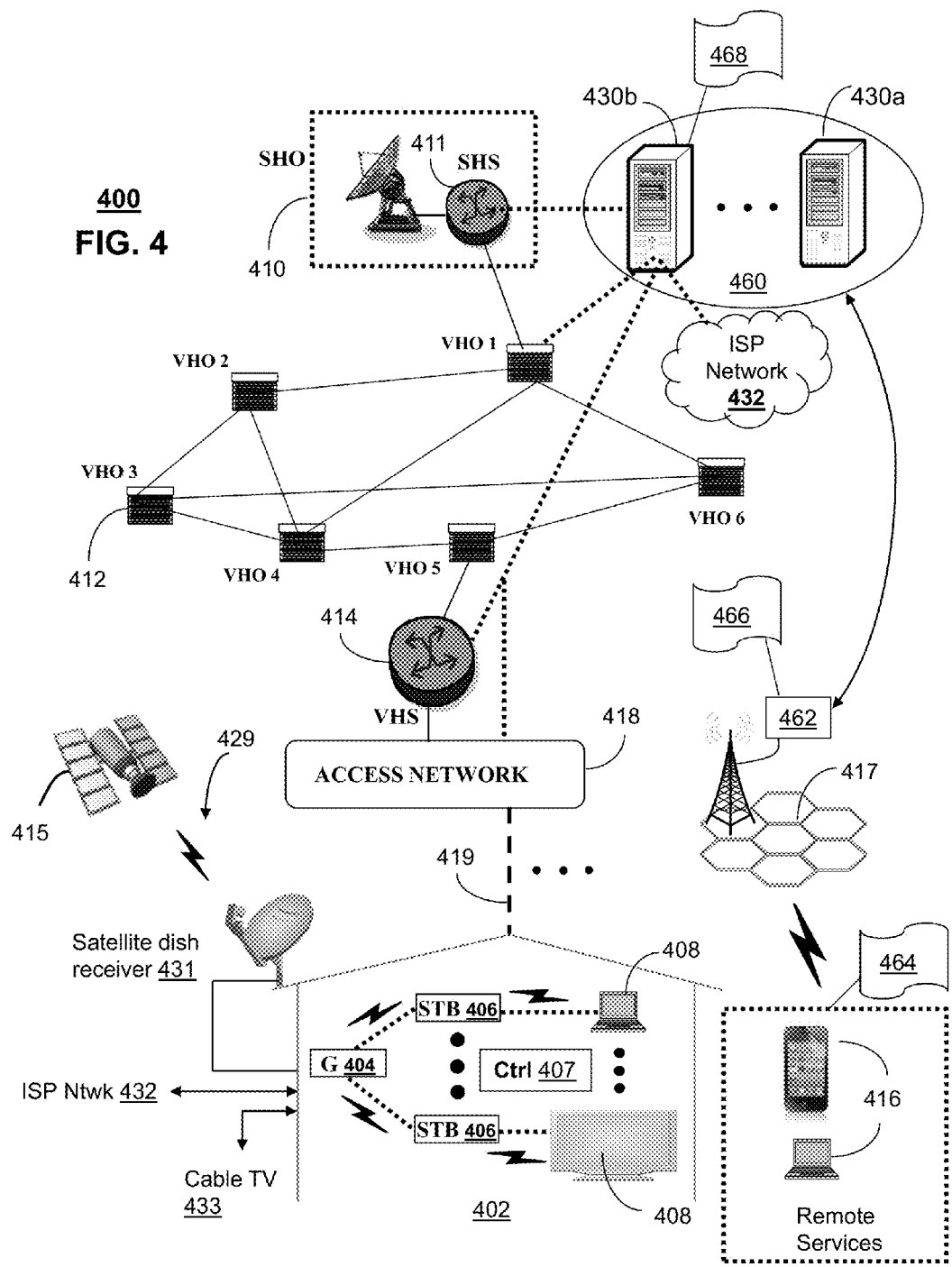
FIG. 4 depicts illustrative embodiments of communication systems that provides media services over communication network topologies including the LTE topology.

FIG. 4 depicts an illustrative embodiment of a first communication system 400 for delivering media content. The communication system 400 can represent an Internet Protocol Television (IPTV) media system. Communication system 400 can be overlaid or operably coupled with an LTE-EPS network, such as the example network depicted in FIG. 1, as another representative embodiment of communication system 400. In some embodiments, the LTE-EPS network 462, 460 facilitates a network connection between a wireless access node, e.g., eNB 462, and a packet data network, e.g., the ISP network 432 or the access network 418, in response to a request from a wireless device, e.g., UE 416, in communication with the wireless access node 462. Responsive to certain eligibility requirements being satisfied, a direct tunnel is established between the wireless access node and a packet gateway 430b in the EPS network 460. According to the direct tunnel, a serving gateway functions, e.g., implemented in a serving gateway 430a of the EPS network 460, typically used in connection with mobility is substantially bypassed.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

The communication system 400 can also provide for all or a portion of the computing devices 430a, 430b to function as network elements of an LTE-EPS network 460 (herein referred to as a SGW 430a and a PGW 430b). The network entities 430a, 430b (generally 430) can use computing and communication technology to perform function 468, which can include among other things, implementing usage of a direct tunnel, essentially bypassing the SGW 430a. A wireless access terminal, such as an eNB 462 and wireless communication devices 416 can be provisioned with software functions 466 and 464, respectively, to coordinate usage of such direct tunnels.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
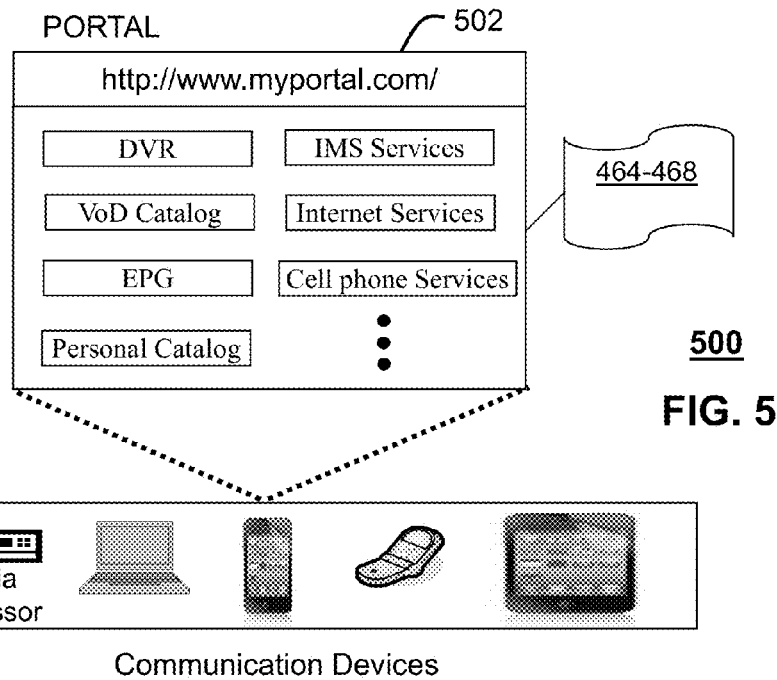
FIG. 5 depicts an illustrative embodiment of a web portal for interacting with the communication systems of FIGS. 1 and 4.

FIG. 5 depicts an illustrative embodiment of a web portal 502 which can be hosted by server applications operating from the computing devices 430 of the communication system 100 illustrated in FIG. 1. Communication system 500 can be overlaid or operably coupled with communication system 400 as another representative embodiment of the system of FIG. 1 and communication system 400. In some embodiments, the LTE-EPS network 100 facilitates a network connection between a wireless access node, e.g., eNB 110a, and a packet data network, e.g., the Internet 140, in response to a request from a wireless device, e.g., UE 108, in communication with the wireless access node. Responsive to certain eligibility requirements being satisfied, a direct tunnel is established between the wireless access node and a packet gateway. According to the direct tunnel, a serving gateway functions typically used in connection with mobility is substantially bypassed.

The web portal 502 can be used for managing services of one or more of the network architecture 100 or the communication system 400. A web page of the web portal 502 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision one or more software applications 464-468 to adapt these applications as may be desired by subscribers and service providers of one or more of the network architecture 100 or the communication system 400.

Figure 6:
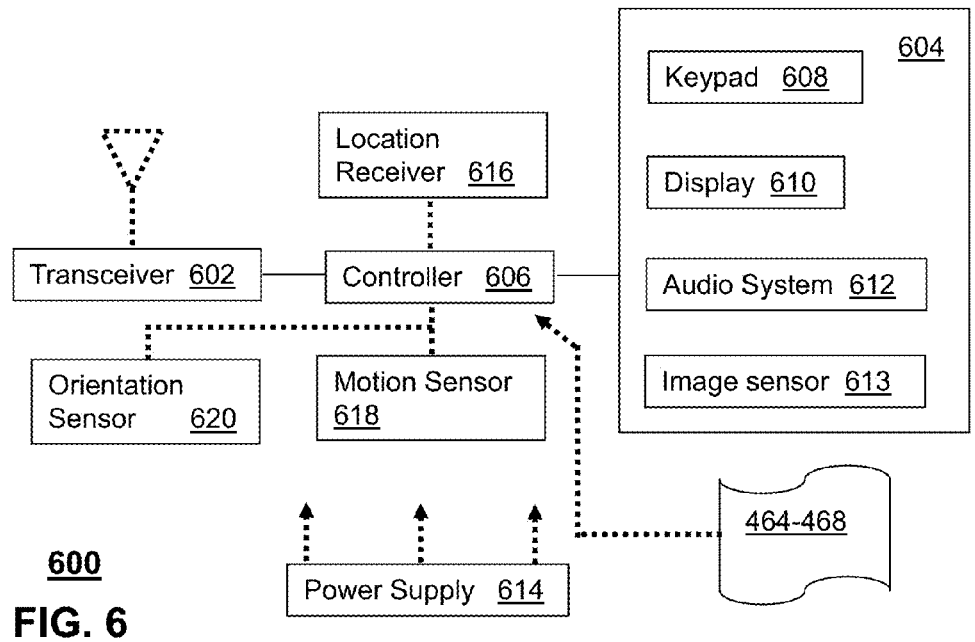
FIG. 6 depicts an illustrative embodiment of a communication device.

FIG. 6 depicts an illustrative embodiment of a communication device 700. Communication device 600 can serve in whole or in part as an illustrative embodiment of the devices depicted in FIGS. 1 and 4. In some embodiments, the LTE-EPS network 100 facilitates a network connection between a wireless access node, e.g., eNB 110*a*, and a packet data network, e.g., the Internet 140, in response to a request from a wireless device, e.g., the communication device 600, in communication with the wireless access node. Responsive to certain eligibility requirements being satisfied, a direct tunnel is established between the wireless access node and a packet gateway. According to the direct tunnel, a serving gateway functions typically used in connection with mobility is substantially bypassed.

To enable these features, communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 406, the media devices 408, or the portable communication devices 416 of FIG. 4, as well as the UE 108 of FIG. 1. It will be appreciated that the communication device 600 can also represent other devices that can operate in one or more of the network architecture 100 of FIG. 1 and the communication system 400 of FIG. 4 such as a gaming console and a media player.

The communication device 600 shown in FIG. 6 or portions thereof can serve as a representation of one or more of the devices of the system of FIG. 1, e.g., as the UE 108, or the communication system 400. In addition, the controller 606 can be adapted in various embodiments to perform the functions 464-468, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
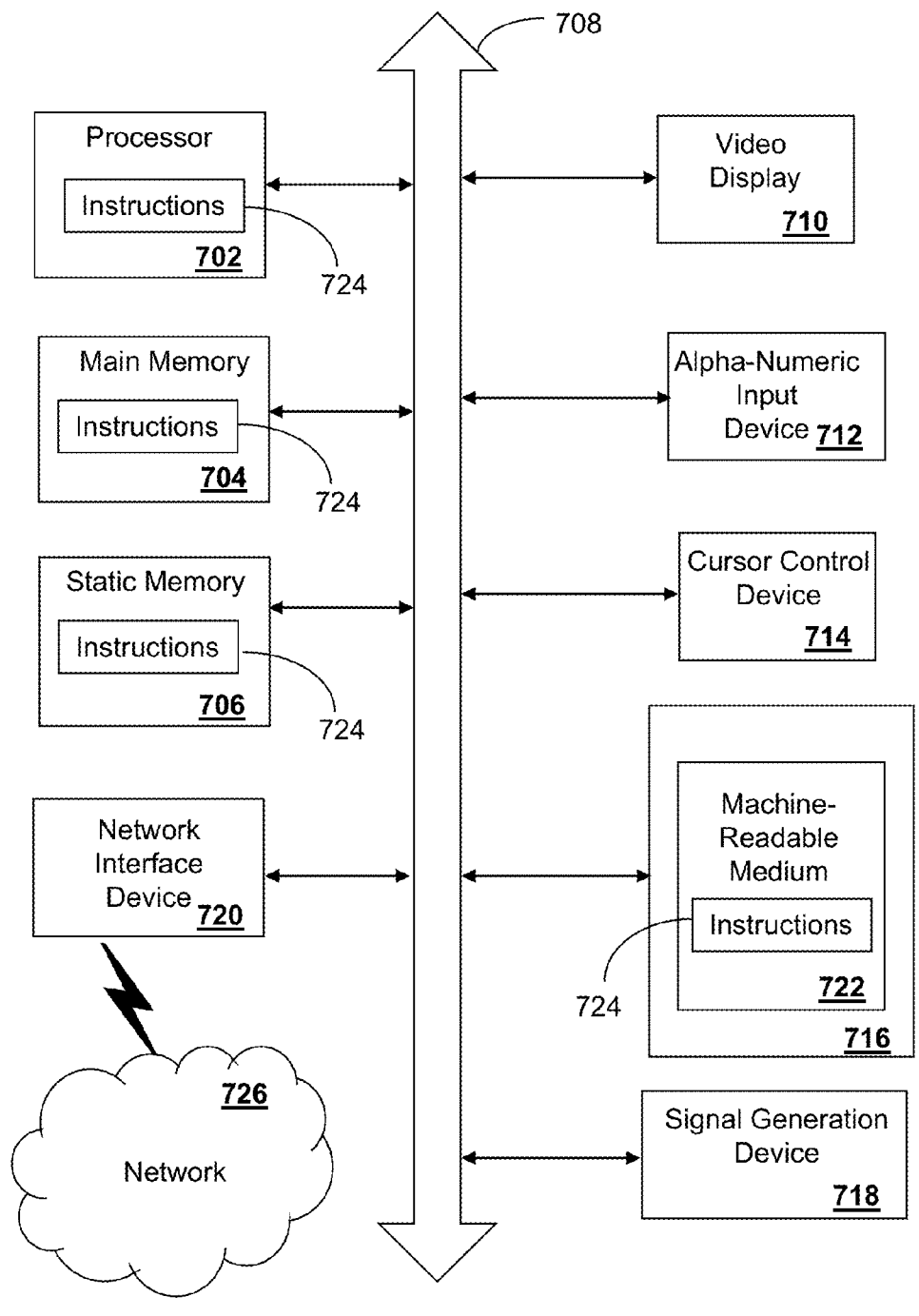
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as one or more of the network entities, such as the eNB 110, the MME 112, the SGW 114, the PGW 120 the HSS 116 or the PCRF 118 and other devices of FIGS. 1 and 4-6. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a processing system comprising a processor, a request for a network connection between a wireless communication device and a packet data network accessible by a packet data network gateway function of a Third Generation Partnership Project evolved packet core (3GPP EPC);

facilitating, by the processing system, a communication session between an evolved node B (eNB) of a Third Generation Partnership Project (3GPP) evolved universal terrestrial radio access network (EUTRAN) and the 3GPP EPC by way of the packet data network gateway function, wherein the eNB is in wireless communication with the wireless communication device, wherein the facilitating of the communication session comprises an exchange of control signaling between a serving gateway function of the 3GPP EPC and the packet data network gateway function, wherein the 3GPP EPC coordinates an exchange of messages between the wireless communication device and the packet data network according to a 3GPP long term evolution system architecture;

determining, by the processing system, a mobility metric of the wireless communication device;

determining, by the processing system, eligibility of the wireless communication device to participate in a direct tunnel connection to the packet data network gateway function, based at least in part on comparing the mobility metric with a preconfigured value obtained from a mobility management entity of the 3GPP EPC; and identifying, by the processing system, a direct tunnel responsive to the determining of the eligibility, wherein the direct tunnel comprises a first tunnel connection between the evolved node B of the 3GPP EUTRAN and the packet data network gateway function of the 3GPP EPC, that bypasses the serving gateway function of the 3GPP EPC, to transfer a plurality of user data packets between the wireless communication device and the packet data network.

2. The method of claim 1, wherein the direct tunnel comprises uplink packets of the plurality of user data packets at the evolved node B having a first destination address of the packet data network gateway of the 3GPP EPC, and downlink packets of the plurality of user data packets at the packet data network gateway of the 3GPP EPC having a second destination address of the evolved node B.

3. The method of claim 2, further comprising:
determining, by the processing system, an updated mobility metric of the wireless communication device;
comparing, by the processing system, the updated mobility metric to a mobility threshold; and
identifying, by the processing system, a revised tunnel solution responsive to the comparing of the updated mobility metric to the mobility threshold, wherein the revised tunnel solution comprises a second tunnel connection to transfer the plurality of user data packets between the wireless communication device and the packet data network by way of the serving gateway function of the 3GPP EPC.

4. The method of claim 3, wherein the revised tunnel solution comprises implementation of a 3GPP general packet radio service protocol.

5. The method of claim 2, wherein the direct tunnel presents an S1 user plane interface address of the evolved node B to the wireless communication device and an S5 user plane interface address of the packet data network gateway to the packet data network, wherein the S1 user plane interface and the S5 user plane interface comprise 3GPP EPC interfaces.

6. The method of claim 1, wherein the mobility metric comprises one of an international mobile subscriber identity number series, an international mobile station equipment identity range, an access point name list, a local policy breakout for roamers or combinations thereof.

7. The method of claim 1, wherein the mobility metric comprises one of a rate of handovers of the communication session between different evolved node Bs, a rate of tracking area update events or a combination thereof, the method further comprising:
monitoring, by the processing system, activity of the wireless communication device;
comparing, by the processing system, the activity to an activity threshold; and
identifying, by the processing system, a revised tunnel solution responsive to the comparing of the activity to the activity threshold, wherein the revised tunnel solution comprises a second tunnel connection to transfer the plurality of user data packets between the wireless communication device and the packet data network by way of the serving gateway function of the 3GPP EPC.

8. A non-transitory machine-readable storage medium comprising executable instructions that, when executed by a processing system including a processor, facilitate performance of operations, comprising:
receiving a request for a network connection between a wireless communication device and a packet data network;
facilitating a communication session between a wireless access node in wireless communication with the wireless communication device and the packet data network, wherein the facilitating of the communication session comprises an exchange of control signaling between a serving gateway function and a packet data network gateway function of a Third Generation Partnership Project evolved packet core network (3GPP EPC) of a Third Generation Partnership Project (3GPP) long term evolution system;
determining a mobility metric of the wireless communication device; and
identifying a tunnel responsive to the determining of the mobility metric, wherein the tunnel comprises a first tunnel connection between the wireless access node and the packet data network gateway function that bypasses the serving gateway function, to transfer a plurality of user data packets between the wireless communication device and the packet data network.

9. The non-transitory machine-readable storage medium of claim 8, wherein the first tunnel connection comprises uplink packets of the plurality of user data packets at the wireless access node having a first destination address of the packet data network gateway of the packet core network, and downlink packets of the plurality of user data packets at the packet data network gateway of the packet core network having a second destination address of the wireless access node.

10. The non-transitory machine-readable storage medium of claim 9, further comprising:
determining an updated mobility metric of the wireless communication device;
comparing the updated mobility metric to a mobility threshold; and
identifying a revised tunnel solution responsive to the comparing of the updated mobility metric to the mobility threshold, wherein the revised tunnel solution comprises a second tunnel connection to transfer the plurality of user data packets between the wireless communication device and the packet data network by way of the serving gateway function.

11. The non-transitory machine-readable storage medium of claim 10, wherein the revised tunnel solution comprises implementation of a general packet radio service protocol.

12. The non-transitory machine-readable storage medium of claim 9, wherein the first tunnel connection presents an S1 user plane interface address of the wireless access node to the wireless communication device and an S5 user plane interface address of the packet data network gateway to the packet data network.

13. The non-transitory machine-readable storage medium of claim 8, wherein the mobility metric comprises one of an international mobile subscriber identity number series, an international mobile station equipment identity range, an access point name list, a local policy breakout for roamers or combinations thereof.

14. The non-transitory machine-readable storage medium of claim 8, wherein the mobility metric comprises one of a rate of handovers of the communication session between different wireless access nodes, a rate of tracking area update events or a combination thereof.

15. A device comprising:
a processing system including a processor; and
a memory that stores executable instructions that, when executed by the processing system, facilitate performance of operations, comprising:
receiving a request for a network connection between a wireless communication device and a packet data network, wherein the packet data network is accessible by way of a packet data network gateway function of a Third Generation Partnership Project evolved packet core (3GPP EPC);

facilitating a communication session between a wireless access node in wireless communication with the wireless communication device and the packet data network, wherein the facilitating of the communication session comprises an exchange of control signaling between a serving gateway function of the 3GPP EPC and the packet data network gateway function, wherein the serving gateway function comprises a mobility anchoring function, and wherein the 3GPP EPC comprises an evolved packet core network of a 3GPP long term evolution system;

determining eligibility of the wireless communication device to participate in a direct tunnel connection of the 3GPP EPC allowing a transfer of a plurality of user data packets between the wireless communication device and the packet data network to bypass the serving gateway function, wherein the eligibility is determined at least in part by comparing a mobility metric of the wireless communication device with a preconfigured value obtained from a mobility management entity of the 3GPP EPC; and facilitating the direct tunnel connection to transfer the plurality of user data packets between the wireless communication device and the packet data network, wherein the direct tunnel connection transports the plurality of user data packets between the wireless communication device and the packet data network by way of the packet data network gateway function of the 3GPP EPC, while bypassing the serving gateway function of the 3GPP EPC.

16. The device of claim 15, wherein the determining of the eligibility comprises determining a mobility trigger.

17. The device of claim 16, wherein the determining of the mobility trigger comprises:

determining the mobility metric as one of a rate of handovers of the communication session between different wireless access nodes, a rate of tracking area update events or a combination thereof; and comparing the mobility metric to a mobility threshold, wherein the eligibility corresponds to the comparing of the mobility metric to the mobility threshold.

18. The device of claim 16, further comprising:

determining an updated mobility trigger of the wireless communication device; and identifying a revised tunnel solution responsive to the updated mobility trigger, wherein the revised tunnel solution comprises a second tunnel connection of the 3GPP EPC to transfer multiple user data packets between the wireless communication device and the packet data network by way of the mobility anchoring function.

19. The device of claim 15, wherein the mobility anchoring function comprises the serving gateway function of the 3GPP EPC.

20. The device of claim 15, wherein the determining of the eligibility comprises examining one of an international mobile subscriber identity number series, an international mobile station equipment identity range, an access point name list, a local policy breakout for roamers or combinations thereof, the eligibility being determined by the one of the international mobile subscriber identity number series, the international mobile station equipment identity range, the access point name list, the local policy breakout for roamers or combinations thereof being predetermined as eligible.

* * * * *